US009964101B2

(12) United States Patent
Rawlings

(10) Patent No.: US 9,964,101 B2
(45) Date of Patent: *May 8, 2018

(54) ADJUSTABLE PUMPING APPARATUS

(71) Applicant: Fluid Metering, Inc., Syosset, NY (US)

(72) Inventor: David Rawlings, Sound Beach, NY (US)

(73) Assignee: FLUID METERING, INC., Syosset, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/195,218

(22) Filed: Jun. 28, 2016

(65) Prior Publication Data
US 2016/0305412 A1 Oct. 20, 2016

Related U.S. Application Data

(60) Division of application No. 14/030,682, filed on Sep. 18, 2013, now abandoned, which is a division of
(Continued)

(51) Int. Cl.
F04B 7/06 (2006.01)
F04B 23/04 (2006.01)
(Continued)

(52) U.S. Cl.
CPC .......... *F04B 23/04* (2013.01); *B01D 19/0042* (2013.01); *C02F 1/20* (2013.01); *C02F 1/76* (2013.01); *F04B 9/02* (2013.01); *F04B 13/00* (2013.01); *F04B 17/03* (2013.01); *F04B 19/06* (2013.01); *F04B 19/20* (2013.01); *F04B 23/06* (2013.01); *F04B 53/06* (2013.01); *F04B 53/14* (2013.01); *F04B 53/166* (2013.01); *C02F 2201/002* (2013.01); *C02F 2303/04* (2013.01); *C02F 2303/08* (2013.01); *C02F 2305/02* (2013.01)

(58) Field of Classification Search
CPC .......... F04B 23/04; F04B 23/06; F04B 13/00; F04B 9/02; F04B 53/14; F04B 53/166; F04B 53/06; F04B 19/0042; F04B 19/20; C02F 1/20; C02F 1/76; C02F 2305/02; C02F 2303/04; C02F 2303/08; C02F 2201/002
USPC ............ 417/216, 426, 429, 500; 92/12.2, 57
See application file for complete search history.

(56) References Cited

U.S. PATENT DOCUMENTS 1,223,122 A 4/1917 Subry
2,276,225 A 3/1942 Carter
(Continued)

*Primary Examiner* — Charles Freay
(74) *Attorney, Agent, or Firm* — Hoffmann & Baron, LLP

(57) ABSTRACT

A pumping apparatus for pumping a liquid from a source to a target including a motor and pump driven by the motor. The pumping apparatus further includes a support frame, a swivel platform pivotably mounted on the support frame and a drive assembly connected with the support frame and the swivel platform for pivoting the swivel platform with respect to the support frame, wherein pivoting of the swivel platform by the drive assembly changes an angle defined between a longitudinal axis of the motor and a longitudinal axis of the pump piston, and wherein a spacer is provided for limiting the range of the angle.

5 Claims, 15 Drawing Sheets

Related U.S. Application Data application No. 12/771,682, filed on Apr. 30, 2010, now Pat. No. 8,562,310, which is a continuation-in-part of application No. 11/414,703, filed on Apr. 28, 2006, now Pat. No. 7,785,084, which is a continuation-in-part of application No. 11/226,733, filed on Sep. 14, 2005, now Pat. No. 7,387,502.

(60) Provisional application No. 60/610,471, filed on Sep. 16, 2004, provisional application No. 60/612,621, filed on Sep. 23, 2004.

(51) Int. Cl.
| | | |
|---|---|---|
| *F04B 13/00* | (2006.01) | |
| *F04B 23/06* | (2006.01) | |
| *F04B 53/06* | (2006.01) | |
| *F04B 17/03* | (2006.01) | |
| *B01D 19/00* | (2006.01) | |
| *C02F 1/20* | (2006.01) | |
| *C02F 1/76* | (2006.01) | |
| *F04B 9/02* | (2006.01) | |
| *F04B 19/06* | (2006.01) | |
| *F04B 19/20* | (2006.01) | |
| *F04B 53/14* | (2006.01) | |
| *F04B 53/16* | (2006.01) | |

(56) References Cited

U.S. PATENT DOCUMENTS

| | | | |
|---|---|---|---|
| 2,623,469 A | 12/1952 | Gray | |
| 2,771,880 A | 11/1956 | Gotthart | |
| 2,892,352 A * | 6/1959 | Saalfrank | F04B 1/07 74/22 R |
| 2,970,021 A | 1/1961 | Glaser et al. | |
| 3,153,385 A | 10/1964 | Bowen, Jr. | |
| 3,382,812 A * | 5/1968 | Smith | F04B 7/06 417/415 |
| 3,502,030 A | 3/1970 | Bukewihge et al. | |
| 3,511,512 A | 5/1970 | Wheelock | |
| 4,231,723 A * | 11/1980 | Spuhl | B01F 15/0454 417/429 |
| 4,575,317 A * | 3/1986 | Lindner | F04B 7/06 417/500 |
| 4,822,059 A | 4/1989 | Shimasaki et al. | |
| 4,941,809 A * | 7/1990 | Pinkerton | F04B 7/06 417/500 |
| 5,015,157 A | 5/1991 | Pinkerton et al. | |
| 5,020,980 A | 6/1991 | Pinkerton | |
| 5,044,889 A | 9/1991 | Pinkerton | |
| 5,092,037 A | 3/1992 | Pinkerton | |
| 5,158,441 A * | 10/1992 | Aid | F04B 7/06 417/500 |
| 5,209,502 A | 5/1993 | Savoia | |
| 5,327,062 A * | 7/1994 | Byers | B23Q 1/4804 318/687 |
| 5,472,320 A | 12/1995 | Weisbrodt | |
| 5,601,421 A | 2/1997 | Lee | |
| 5,921,555 A | 7/1999 | Johnston | |
| 5,941,533 A | 8/1999 | Jacobsen et al. | |
| 5,995,392 A | 11/1999 | Turner | |
| 6,095,780 A | 8/2000 | Emens | |
| 6,409,175 B1 | 6/2002 | Evans et al. | |
| 6,428,013 B1 | 8/2002 | Johnston et al. | |
| 6,598,593 B1 | 7/2003 | Kanamaru et al. | |
| 7,387,502 B1 * | 6/2008 | Rawlings | F04B 23/06 137/210 |
| 7,572,106 B2 * | 8/2009 | Nagao | B41F 31/08 101/366 |
| 7,785,084 B1 * | 8/2010 | Rawlings | F04B 13/00 417/500 |
| 8,061,227 B2 * | 11/2011 | Sakai | F16C 23/086 74/89.32 |
| 2002/0176791 A1 | 11/2002 | Uera | |
| 2004/0241023 A1 | 12/2004 | Pinkerton et al. | |
| 2005/0103613 A1 | 5/2005 | Miller | |
| 2005/0238461 A1 | 10/2005 | Lutkus et al. | |
| 2006/0169134 A1 | 8/2006 | Dunaevsky et al. | |
| 2009/0151928 A1 | 6/2009 | Lawson | |
| 2009/0168276 A1 | 7/2009 | Chen et al. | |

* cited by examiner

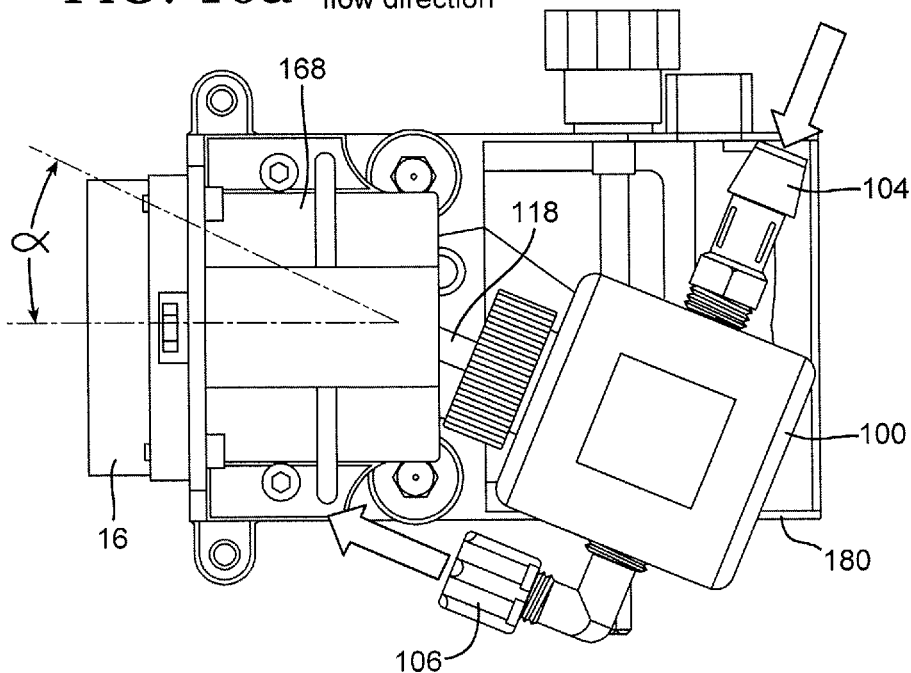
FIG. 10a  Correct fluid flow direction
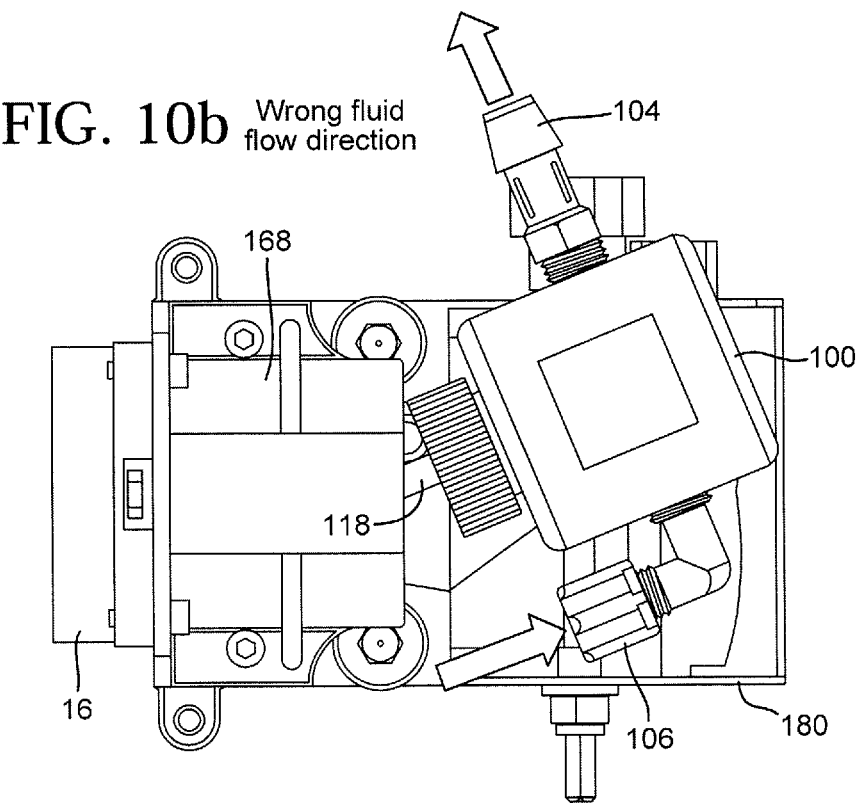
FIG. 10b  Wrong fluid flow direction

ADJUSTABLE PUMPING APPARATUS

CROSS-REFERENCE TO RELATED APPLICATIONS

This application is a divisional application of U.S. Ser. No. 14/030,682, filed Sep. 18, 2013, which is a divisional application of U.S. Ser. No. 12/771,682, filed Apr. 30, 2010, now U.S. Pat. No. 8,562,310, which is a continuation-in-part application of U.S. Ser. No. 11/414,703, filed Apr. 28, 2006, now U.S. Pat. No. 7,785,084, which is a continuation-in-part of U.S. Ser. No. 11/226,733, filed Sep. 14, 2005, now U.S. Pat. No. 7,387,502, which claims the benefit of U.S. Provisional Application No. 60/610,471, filed on Sep. 16, 2004 and U.S. Provisional Application No. 60/612,621, filed on Sep. 23, 2004.

FIELD OF THE INVENTION

The present invention relates generally to liquid pumping systems, wherein one liquid is pumped or fed into the stream of another liquid. More particularly, the present invention relates to a method and apparatus that minimizes gases in the liquid pumping system.

BACKGROUND OF THE INVENTION

There are situations in which it is necessary to inject or feed one liquid into the stream of another liquid. Some liquid pumping systems require an occasional injection of liquid while others need a more continuous feed of the liquid. Still others might require a combination of the two. For purposes of this disclosure, it is understood that the term "feed" will include inject.

One such common application is in the field of water treatment wherein certain chemicals, such as chlorinating solutions, fluorination chemicals and other liquids, are fed into the water stream at a point prior to its delivery for end use by consumers. It is important to maintain certain percentage levels of these added liquids in order to assure adequate functionality without exceeding predetermined concentrations which could be objectionable or even harmful to the consumer.

A variety of apparatus is available in the industry to perform this chemical feed task. Such apparatus typically takes the form of a pump, wherein pump speed and chemical feed rate is controlled by well known electronic means which employs chemical concentration detection means and provides voltage or current signal output for use by the pump drive system to adjust its feed rate. This system operates in a closed loop fashion to maintain a relatively stable concentration of the desired chemical in the water stream.

Certain chemicals, particularly sodium hypochlorite (NaOCl) solution used for chlorination of the water system, exhibit the troublesome characteristic of constant gas generation. Specifically, the liquid NaOCl spontaneously out-gases in such a way that bubbles form in conduit piping, fittings and any other cavities in the feed circuit. Positive displacement pumps attempting to draw this liquid from storage tanks and feed it into the water stream can become gas-bound when encountering such gas bubbles. Once gas-bound, the pump will simply work against a "springy" bubble, which will alternately compress and expand to entirely devour the pump's displacement stroke volume. At this point, feeding of liquid chemical into the water stream ceases and the pump will uselessly run without effect.

This problem is aggravated by the often encountered requirement to feed the liquid chemical directly into a pressurized water stream. Here, even a modest sized gas bubble will give rise to a gas bound condition as the pump unsuccessfully attempts to compress the gas sufficiently to force it out of the pump chamber against the water stream back pressure. The problem is sufficiently severe that certain water treatment facilities undertake the extra step of diluting the sodium hypochlorite solution in the liquid chemical supply tank in order to reduce gas bubble formation. It can be reliably stated that the most aggravating problem known in the water chlorination and disinfection industry is the off-gas generated by the sodium hypochlorite NaOCl solution.

Another related problem is associated with priming. Once a chemical vessel is emptied, the feed apparatus will draw in air and entirely fill the intake circuit (including tubing, fittings, internal chambers and such) with this air. The chemical concentration detection apparatus will then signal or alarm for intervention by a technician. Chemical feed restoration now requires that a full liquid chemical vessel be substituted for the empty vessel followed by a troublesome and time consuming sequence of valve openings/closings by a skilled technician to bleed offending air out of the circuit in order to prime the pump. Only after the technician confirms by observation that the feed pump is actually feeding liquid into the water stream can the task be considered completed. This problem of manual bleeding is common to any liquid chemical application and is in addition to and apart from the out-gassing characteristics of NaOCl solutions.

Numerous attempts have been made to solve the problems described herein. For example, it is known in the field to incorporate a solenoid operated purge valve in a liquid pump, which is manually or automatically operated to divert the pressure output port of the feed pump away from the pressurized water stream and back to the liquid chemical supply tank. Once liquid has filled the pump circuit, the valve is shifted back so as to direct the chemical liquid into the pressurized water stream. However, the drawbacks of such prior art solutions include complex electronics, additional valves, manual intervention or urgent attention on the part of technicians.

Another problem associated with liquid NaOCl pumping systems is the corrosive effect that chlorine vapors have on the various metal components of the system. Specifically, metal screws, clamps, and even stainless steel components are vulnerable to corrosion by exposure to these chlorine vapors.

Still another design consideration with such pumping systems is the necessity that the system only pump in one direction. For example, in the field of water treatment, wherein a chlorinating solution is fed into a water stream, it would be very detrimental if the pumping system were to malfunction and pump in the reverse direction whereby water from the water stream is pumped into a liquid NaOCl supply. Since most motors used in such pumping applications are typically direct current (DC) motors, such malfunction could occur, for example, if the polarity of the current flowing to the motor were somehow reversed. Reversed pumping can also occur if the pumps and motor couplings are not properly oriented with respect to the motor upon installation.

The pumps themselves must also be carefully designed to prevent any leakage. Proper operation of these pumps is largely dependent on the precise angular and axial orientation of the pump piston with respect to the pump's inlet and outlet ports. Any misalignment between the two can result in a pressure build-up within the pump causing the end cap of the pump housing to rupture.

Another difficulty encountered in certain pumping applications of this type has been associated with loss of supply liquid. This can occur if the pumping unit is installed in a remote location with little or no routine maintenance, combined with no monitoring of supply vessel liquid level. In such situations, loss of supply liquid to the pumping unit will result in termination of "hypo" injection into the water stream. This loss of supply liquid will be detected by monitoring equipment, which normally controls the pumping injection rate by speeding up the pump motor or slowing it down accordingly when free supply liquid percentages fall or rise.

The loss of supply liquid will, if not corrected, lead the detection equipment to attempt to raise the supply liquid levels by directing the motor of the pumping unit to increase its speed. This speed will increase all the way to maximum, where it will remain until a technician intervenes. Such intervention may not occur for hours or days. Meanwhile the pump will be running at high speed with no liquid to cool or lubricate its moving parts. It has been found under such circumstances that the pump components will heat up from friction effects to the point where drag gradually increases and the pump eventually seizes. This can sometimes cause the drive motor to burn out if the drive electronics is not adequately fused or the pump elements can become fused together such that full dismantling is required in order to free them.

Accordingly, it is desirable to provide a simply designed system, wherein gas bubbles are dispatched automatically while replacement of an empty liquid chemical supply tank and commissioning of a new full tank is simply done by switching input tubing from the empty to the full tank. It would be further desirable to provide an apparatus requiring no priming and does not require the pump to be turned off when changing liquid supplies. It would also be desirable for such an apparatus to include pumps that are substantially leak-free, rupture-free and less prone to chemical precipitate build-up with resultant mechanical failure. It would still be further desirable to provide a liquid NaOCl pumping system that is less vulnerable to the corrosive effects that chlorine vapors have on the various metal components of the system and that is safe-guarded for pumping in only one direction. It would also be desirable to provide a liquid pumping system that will not be damaged in the event of a loss of supply liquid.

SUMMARY OF THE INVENTION

The present invention is a pumping apparatus for pumping a liquid from a source to a target including a motor, a first pump driven by the motor, a second pump driven by the motor and a separator in fluid communication with the first and second pump for separating a liquid received from a source into a gaseous component and a liquid component. The separator further diverts the gaseous component to the first pump and the liquid component to the second pump, wherein the first pump pumps the gaseous component back to the source and the second pump pumps the liquid component to a target.

In a preferred embodiment, the separator is a T-fitting having a downward oriented arm for separating the liquid component under the influence of gravity and permitting horizontal flow of the gaseous component. The apparatus further preferably includes a substantially vertically oriented tube connecting the downward arm of the T-fitting to the pump. Also, the motor, the first pump and the second pump are substantially horizontally arranged.

The pumping apparatus of the present invention is preferably contained in a portable and mountable case having an inlet mounted thereon for fluidly connecting the separator to the liquid source, a gas outlet mounted thereon for fluidly connecting an output port of the first pump to the liquid source and a liquid outlet mounted on the case for fluidly connecting an output port of the second pump to the target. The case further preferably includes a hinged cover for permitting access to the motor, pumps and separator contained in the case and a drain outlet for draining any fluid leakage from the interior of the case. The hinged cover may be suspended from the case in a substantially horizontal position by a lanyard.

The pumping apparatus can be provided with a wash-water subsystem for cleaning the first and second pumps. The wash-water subsystem preferably includes tubing connected to the first and second pumps for delivering wash-water to the pumps and a flow restrictor for regulating the flow of the wash-water to the pumps.

The present invention further involves a method for pumping a liquid from a source to a target. The method generally includes the steps of separating the liquid into a gaseous component and a liquid component, diverting the gaseous component to a first pump, diverting the liquid component to a second pump, pumping the gaseous component back to the liquid source with the first pump and pumping the liquid component to the target with the second pump.

Thus, the present invention calls for the use of a separate pump whose function is to draw whatever is in the intake line up to a point above the intake for the primary feed pump. At this point there is a T-fitting with a large diameter pipe connection leading downwards to the intake port of the main feed pump. The output line of the first pump is connected to tubing which leads back to the liquid chemical supply tank. There is little or no restriction to the flow of liquid through the first pump so it experiences no difficulty drawing gas, liquid or a combination thereof out of the chemical supply tank and returning it back again to this same tank.

As liquid or gas passes over the down facing port of the T-fitting on its way to the input of the first pump, liquid falls down under the influence of gravity to the intake port of the primary feed pump (second pump). This intake port, in turn, is angled upwards so that it becomes flooded with liquid. A suitably designed pump is then able to self clear small amounts of gas so long as its intake port is flooded with liquid.

In a preferred embodiment, at least one of the pumps of the present invention includes a pump housing and a pump piston. The pump housing defines a central longitudinal bore, a transverse bore communicating with the central bore for conveying a liquid through the pump housing and a liquid reservoir communicating with the central bore and the transverse bore for retaining an amount of the liquid conveyed through the transverse bore. The pump piston is axially and rotatably slidable within the central longitudinal bore for pumping the liquid through the transverse bore.

In this embodiment, the pump housing further preferably includes an inlet port and an outlet port, and the transverse bore includes an inlet portion extending between the inlet port and the central bore and an outlet portion extending between the central bore and the outlet port. A pressure relief slot is preferably formed in the central bore between the inlet portion of the transverse bore and the liquid reservoir to facilitate liquid flow therebetween. The central bore further preferably terminates at an opening formed in the housing. The piston extends out from the opening and the pressure relief slot extends from the inlet portion of the transverse bore to the housing opening.

A lip seal assembly is preferably disposed at the housing opening for sealing the piston. The lip seal assembly includes two annular lip seals having lip portions in sliding contact with the piston. The lip portions of the lip seals are bent outwardly away from the housing opening to facilitate scraping of the piston. In this regard, the piston further preferably includes an outer surface having a vapor-deposited polytetrafluoroethylene (PTFE) coating.

The present invention further involves a method for preventing the formation of precipitates in a liquid chlorine solution pump. The method includes the steps of moving a piston within a bore of the pump to draw liquid chlorine solution into the pump, moving the piston within the bore to force liquid chlorine solution out of the pump and retaining an amount of the liquid chlorine solution in a liquid reservoir formed in the pump. The liquid reservoir is in fluid communication with the pump bore and the amount of the liquid chlorine solution retained in the reservoir is sufficient to prevent crystallization of the chlorine solution in the pump during an idle period of the pump. The volume of liquid retained by the reservoir is preferably at least approximately 0.7 cc. Retaining an amount of liquid chlorine solution in the liquid reservoir essentially decreases the surface to volume ratio of the liquid chlorine solution, thereby reducing evaporation and consequential formation of crystals within the pump.

As described above, one embodiment of the present invention provides for a wash-water subsystem configured to continuously flush the pumps internal structures. This is done for two reasons:

Reduce crystallization caused by evaporation of sodium hypochlorite.

Establish a water barrier between the sodium hypochlorite and the lip seals, thereby assuring that any leakage past said lip seals is merely water and not sodium hypochlorite solution.

An unanticipated consequence of this arrangement is that, in certain situations, dissolved metallic salts in the wash water (notably the copper salts) can react with the sodium hypochlorite solution to form insoluble precipitates which can build up on the internal structures of the pump and ultimately lead to seizure of the moving parts. Such dissolved metallic salts can be eliminated through the use of purified water but the cost and additional complications associated with this arrangement has led to the improved non-wash water embodiment described herein.

In a preferred embodiment, the step of drawing liquid chlorine solution into the pump involves the step of creating a negative pressure in an inlet of the pump and the step of forcing liquid chlorine solution out of the pump involves the step of creating a positive pressure in an outlet of the pump. The inlet and the outlet are in fluid communication with the liquid reservoir, whereby the negative and positive pressures induce a flow of liquid chlorine solution between the liquid reservoir and the inlet and the outlet via a pressure relief slot formed in the pump bore. This negative pressure is communicated directly to the lip seal area such that, in the absence of a positive pressure, sodium hypochlorite solution is encouraged to stay inside the pump instead of being expelled past the sealing face of the lip seal.

The present invention further preferably utilizes sacrificial zinc components to minimize corrosion due to chlorine vapors. Specifically, in a preferred embodiment, the chlorination system of the present invention includes a source of chlorine solution, a mounting plate comprising zinc, a motor mounted to the mounting plate and a first pump mounted to the mounting plate and driven by the motor for pumping the chlorine solution from the source into a supply of water. In a preferred embodiment, the mounting plate is a steel plate coated with zinc.

As described above, a second pump mounted to the zinc coated mounting plate is preferably utilized in conjunction with a separator in fluid communication with the source of chlorine solution and the first and second pumps for separating chlorine solution received from the source into a gaseous component and a liquid component. The separator further diverts the gaseous component to the second pump and the liquid component to the first pump, wherein the second pump pumps the gaseous component back to the chlorine solution source and the first pump pumps the liquid component into the supply of water.

In this embodiment, the motor and the pumps are preferably mounted to the zinc coated mounting plate with zinc die-cast fasteners, (although stainless steel fasteners can also be used). In addition, the motor preferably includes a rotatable motor shaft, a zinc coated mounting plate in contact with the motor shaft via a steel bearing and a spherical steel coupling coupled between said motor shaft and said first pump.

The present invention further preferably takes measures to ensure that liquid is pumped in only one direction. In one embodiment, electrical measures are taken, wherein the pumping apparatus generally includes a direct current motor and a full wave rectifier. The motor has a rotatable motor shaft, a positive input terminal and a negative input terminal and the full wave rectifier is interposed between the motor and a current source supplying electrical current to the motor. The full wave rectifier has a positive output terminal and a negative output terminal, wherein the positive output terminal is electrically connected to the positive input terminal of the motor and the negative output terminal is electrically connected to the negative input terminal of the motor, whereby a desired polarity of current flows to the motor to ensure that the motor shaft rotates in only one direction, thereby causing the first pump coupled to the motor shaft to pump liquid in only one direction from a source to a target.

In an alternative embodiment for ensuring pumping in only one direction, the pumping apparatus generally includes a support frame, a motor mounted on the support frame, a swivel platform pivotably mounted on the support frame, a drive assembly connected with the support frame and the swivel platform and a pump mounted on the swivel platform. The drive assembly pivots the swivel platform with respect to the support frame and includes a drive rod and a spacer. The drive rod is coupled to the swivel platform and the support frame and the spacer is engageable between the support frame and the swivel platform to prevent further pivoting of the swivel platform with respect to the support frame. The pump includes a rotatable and axially translatable piston coupled to the motor shaft of the motor, wherein pivoting of the swivel platform by the drive means changes an angle defined between a longitudinal axis of the motor shaft and a longitudinal axis of the pump piston and the spacer of the drive assembly limits the range of said angle.

In this embodiment, the drive rod is preferably in the form of a threaded rod rotatably retained on opposite sides of the support frame and threadably engaged with the swivel platform. The spacer is preferably in the form of a tubular sleeve member surrounding a portion of the threaded rod. Also, the support frame preferably includes an inner pocket having a width for receiving the swivel platform, wherein the inner pocket defines a range of pivoting of the swivel platform. In this case, the threaded rod and the spacer are disposed within the inner pocket, and the spacer has a length substantially equal to half the width of the inner pocket.

To minimize the risk of rupturing the liquid pump of the present invention preferably includes a pump housing defining a central longitudinal bore and a transverse bore communicating with the central bore and a rotatable pump piston axially slidable within the central longitudinal bore between a fully retracted position and a full forward position for pumping the liquid through the transverse bore. The pump piston includes a relieved portion in fluid communication with the transverse bore of the pump housing when the piston is axially inserted within the pump housing in its full forward position.

In this embodiment, the relieved portion of the pump piston is preferably defined by a planar surface, wherein the planar surface defines a zero reference plane when the piston is axially inserted within the pump housing in its full forward position. This zero reference plane is disposed at an acute angle with respect to the center axis of the transverse bore. This acute angle is preferably about 5 degrees. The pump housing further preferably includes a piston liner defining the central longitudinal bore and the transverse bore and a pump casing surrounding the piston liner. The pump casing has a reference surface aligned with the zero reference plane of the pump piston, wherein the piston liner is rotated with respect to the pump casing about a center axis of the central longitudinal bore.

To prevent overheating and damage to the pump components, the pumping apparatus of the present invention preferably includes a motor, a current source supplying electrical current to the motor and a positive temperature coefficient (PTC) resistor interposed between the motor and the current source. The positive temperature coefficient (PTC) resistor has a current trip value, wherein current from the current source exceeding the current trip value causes a resistance of the positive temperature coefficient (PTC) resistor to rise to a value such that current to the motor decreases. A visual indicator is also preferably provided for indicating when the current from the current source has exceeded the current trip value of the positive temperature coefficient (PTC) resistor.

As a result of the present invention, an apparatus is provided which utilizes a novel means for dealing with the presence of gas in the liquid chemical intake plumbing. Also, the design of the present invention further provides the ability to self prime against a pressurized system, even in the event of total gas entrainment into the intake liquid circuit. Thus, the present invention is particularly suitable for use as part of a chlorination system for delivering a chlorine solution into a water supply.

The preferred embodiments of the apparatus and method of the present invention, as well as other objects, features and advantages of this invention, will be apparent from the following detailed description, which is to be read in conjunction with the accompanying drawings.

BRIEF DESCRIPTION OF THE DRAWINGS

FIG. 5a is a cross-sectional view of an alternative embodiment of the pump shown in FIG. 4 taken along line 5-5.

FIG. 10a is a plan view of the pump and pump/motor coupling angularly oriented to pump fluid in the correct direction.

FIG. 10b is a plan view of the pump and pump/motor coupling, wherein the pump has been angularly pivoted resulting in fluid flow in the wrong direction.

DETAILED DESCRIPTION OF THE PREFERRED EMBODIMENTS

Figure 1:
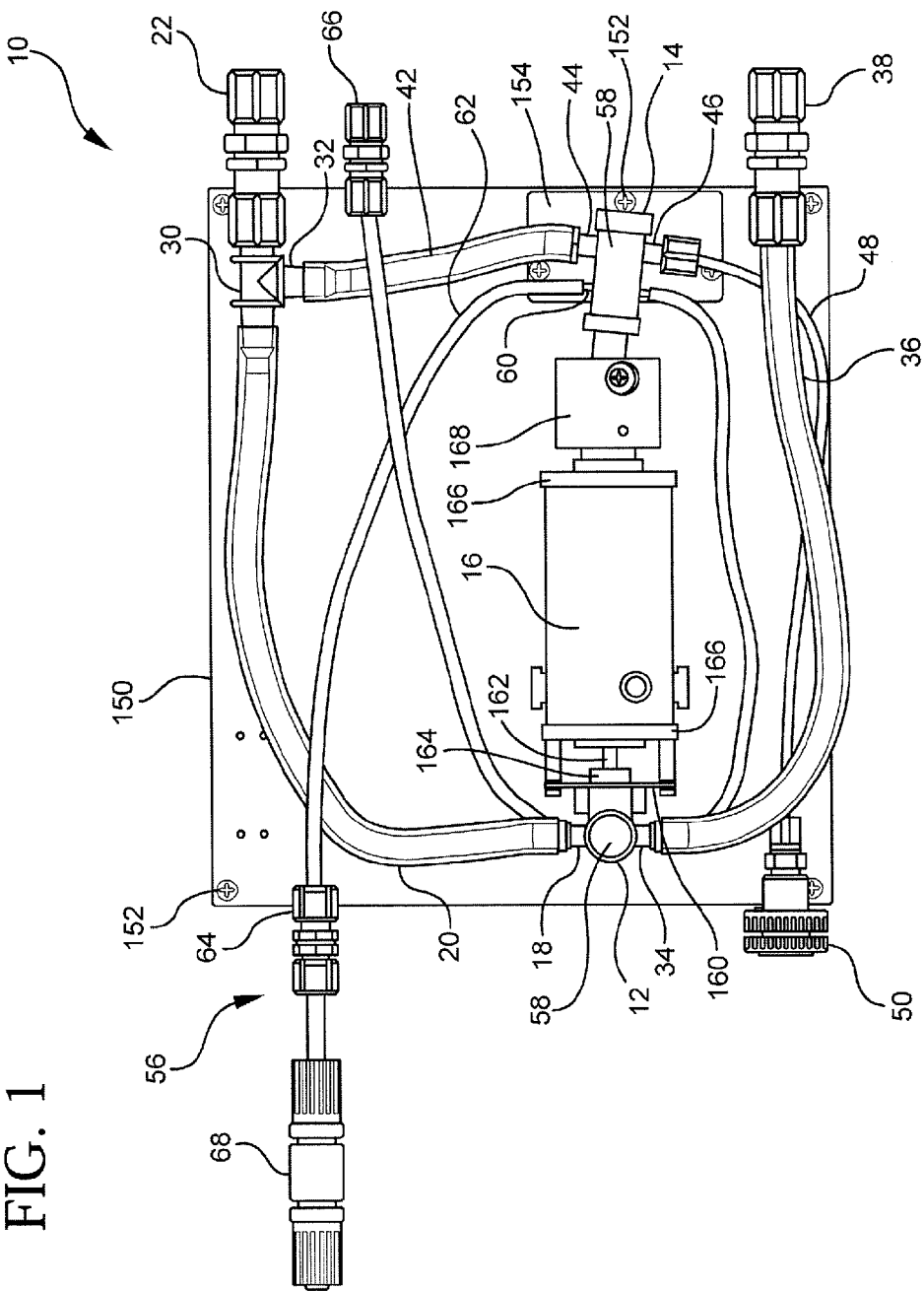
FIG. 1 is a cross-sectional view of one embodiment of the pumping apparatus formed in accordance with the present invention.
Figure 2:
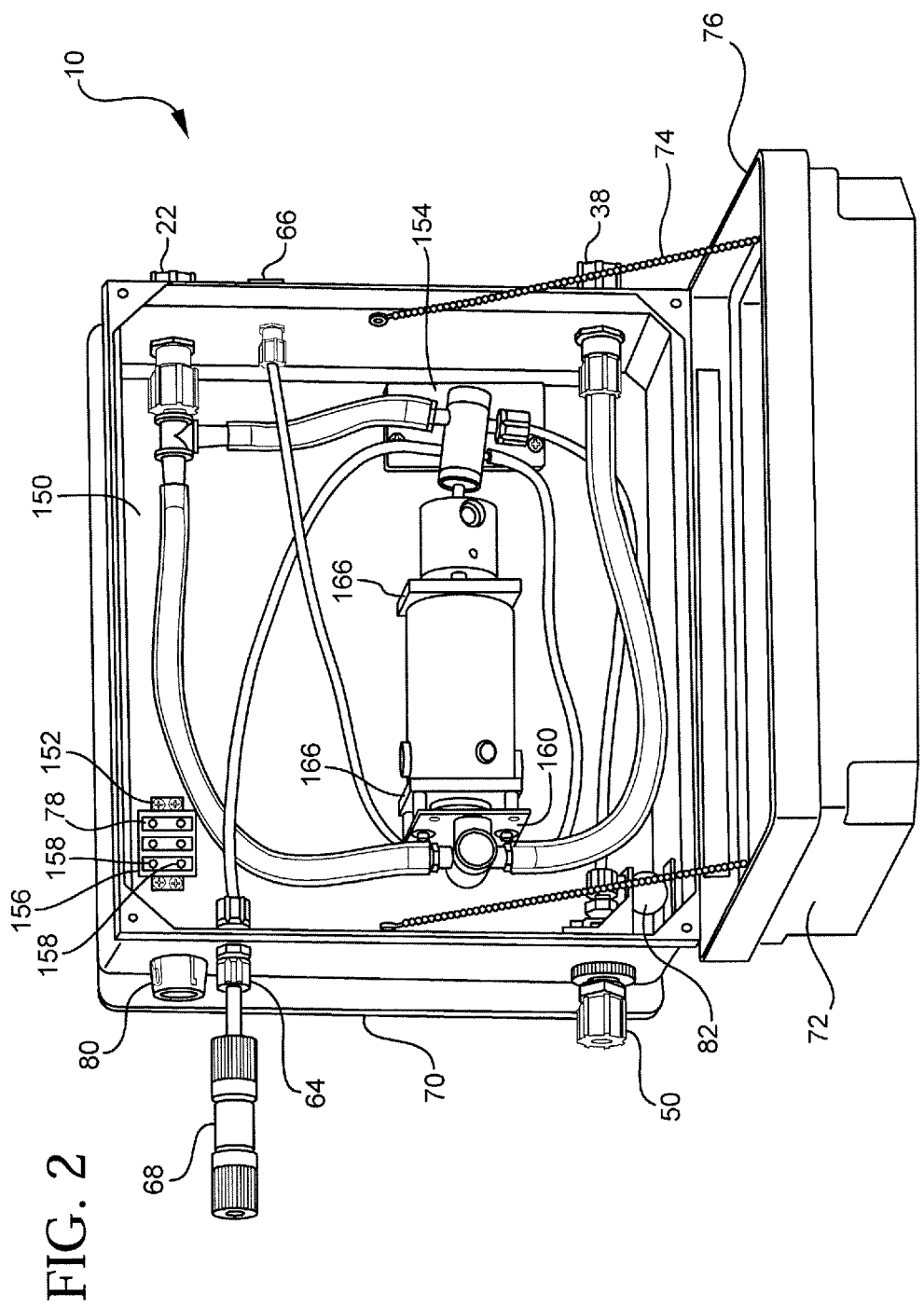
FIG. 2 is a perspective view of the pumping apparatus shown in FIG. 1 contained in a compact mountable case.

FIGS. 1 and 2 illustrate the preferred embodiment of the present invention. The present invention is a pumping apparatus 10, which generally includes a first pump 12 and a second pump 14 coaxially mounted to and driven by a motor 16. When the motor 16 is energized it drives both pumps 12 and 14 simultaneously.

Pumps 12 and 14 are preferably positive displacement pumps oriented in a horizontal arrangement wherein the axes of the pumps are generally horizontal with respect to the motor 16, as shown in FIG. 1. A desirable pump for use in the present invention as the first pump 12 is the "RO Pump" supplied by Fluid Metering, Inc., Syosset, N.Y. (www.fmipump.com). A desirable pump for use in the present invention as the second pump 14 is the "Q-1CTC Pump" also supplied by Fluid Metering, Inc.

A desirable DC motor for use in the present invention is a motor similar to Groschopp Part No. PM6015 supplied by Groschopp, Inc., 420 15$^{th}$ Street NE, Sioux Center, Iowa, with modifications, including a shorter overall length and stainless steel shafts. Other modifications to the motor in accordance with the present invention are described in detail further below.

Figure 3:
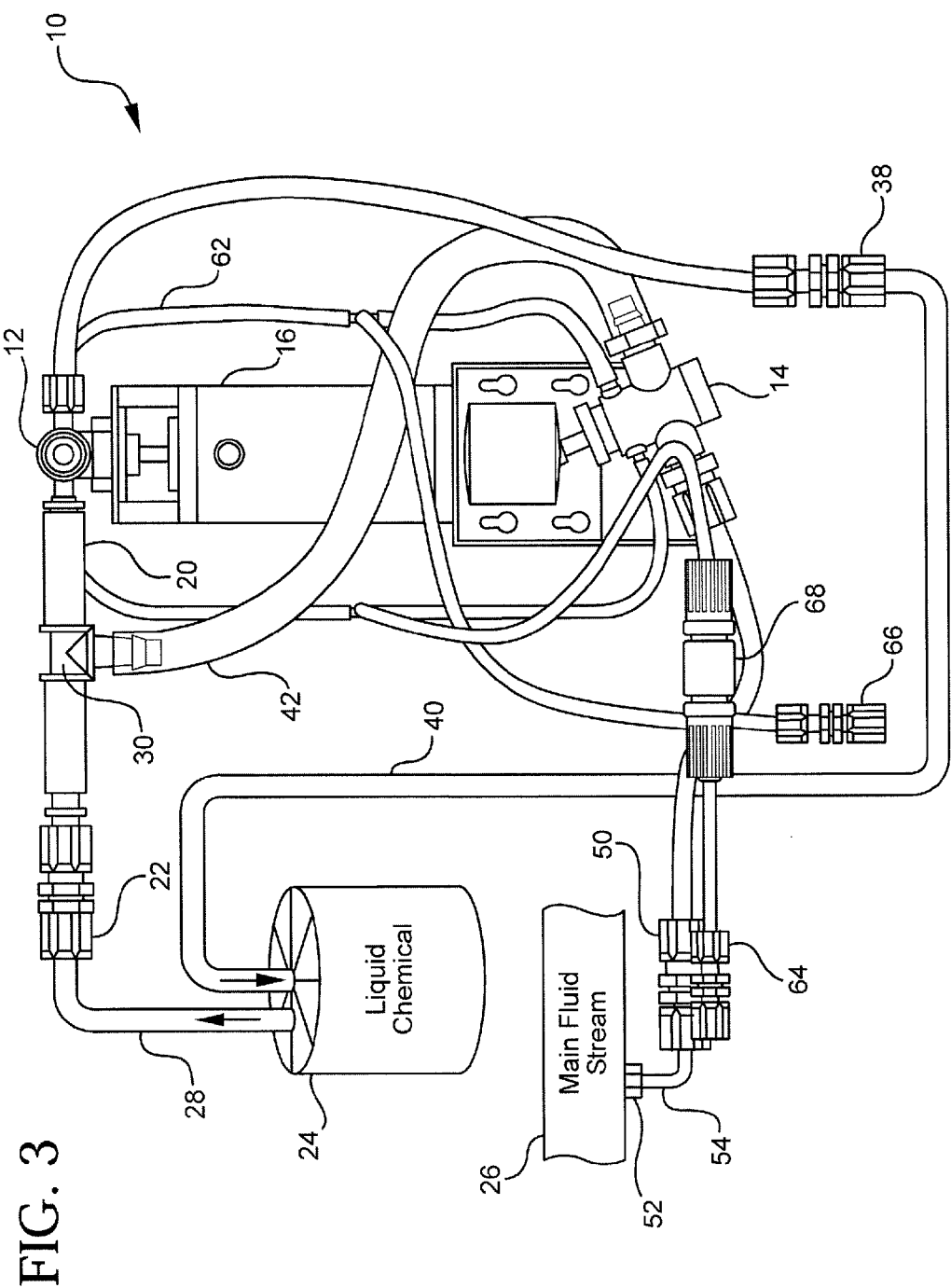
FIG. 3 is a cross-sectional view of an alternative embodiment of the pumping apparatus formed in accordance with the present invention.

While the first pump 12 is being driven by the motor 16, it draws a liquid into its intake port 18 via an intake conduit 20. At its opposite end, the intake conduit 20 is connected to an inlet 22, which in turn is adapted to be connected to a liquid source, such as a cistern 24 containing a chemical to be injected or fed into a main fluid stream 26, as shown in FIG. 3. The inlet 22 is preferably a quick-connect type fitting adapted to be fluidly connected to a hose, a pipe or other type of conduit 28 leading to the liquid source 24.

Interposed along the path of the intake conduit 20, between the intake port 18 of the pump 12 and the inlet 22, is a separator 30 for separating the liquid supplied from the liquid source 24 into a gaseous component and a liquid component. The separator 30 is preferably a junction, such as a T-fitting, oriented along the path of the intake conduit 20 to facilitate horizontal flow through the fitting and having one arm 32 oriented vertically downward. In this manner, as a gas/liquid mix passes through the T-fitting 30, the liquid component of the mixture falls downward through the vertical arm 32 of the fitting under the influence of gravity.

Any gaseous component of the liquid fed through the inlet 22 flows horizontally through the T-fitting 30 and is drawn into the intake port 18 of the first pump 12. This gaseous component is then discharged out of an output port 34 of the first pump 12 into a gas return tube 36, which terminates at a gas outlet 38 of the apparatus 10. The gas outlet 38 is also preferably a quick-connect type fitting adapted to be connected to a return line 40 running back to the liquid source 24, as shown in FIG. 3.

The vertical arm 32 of the T-fitting 30 is connected to a vertically oriented, large diameter liquid feed tube 42, which, at its opposite end, is connected to an intake port 44 of the second pump 14. This liquid feed tube 42 is preferably of large enough bore to avoid trapping bubbles under a liquid column. Experimentation has suggested that tubing with an internal diameter of about ⅜" works nicely in this regard.

The vertical orientation of the liquid feed tube 42 further ensures that the degassed liquid which has fallen down from the vertical arm 32 of the T-fitting 30 displaces any gas at the intake port 44 of the second pump 14. As a result, the second pump 14 is now self-priming.

The second pump 14 discharges the degassed liquid out of an output port 46 into a liquid discharge tube 48, which is connected to a liquid outlet 50. The liquid outlet 50 is again preferably a quick-connect type fitting, which is adapted to be connected to an inlet 52 of the main fluid stream 26 via a liquid feed line 54, as shown in FIG. 3. The second pump 14 thus delivers the degassed liquid to the main fluid stream 26 against the pressure head of the main supply.

The system 10, according to one embodiment of the present invention, further includes a wash-water subsystem 56 for lubricating and cleaning out the pumps 12 and 14. Specifically, each pump head 58 of the pumps 12 and 14 preferably include a feature called an "Isolation Gland" or "Wash Gland" wherein the pump head includes a pair of extra ports 60 which are connected to wash-water lines 62. The wash-water lines 62 fluidly connect a wash-water supply port 64 to a wash-water waste port 66, wherein the pump heads 58 may be connected in series along the wash-water line path, as shown in FIGS. 1 and 2, or they may be connected in parallel, as shown in FIG. 3.

The wash-water subsystem 56 further preferably includes a flow restrictor 68 for restricting the flow of the incoming wash-water into the wash-water supply port 64 before the water enters the pump heads 58. A suitable flow restrictor for use in the present invention is a 150 ML/min restrictor.

The wash-water subsystem 56 provides the function of maintaining clean pumps as described above and also provides a sort of lubrication to help the pump start up after extended periods of non-operation. The purpose of the flow restrictor 68 in the present invention is to regulate the amount of wash-water which is introduced into the wash glands of the two pump heads 58. Municipal water sources generally provide water at elevated pressure (upwards of 100 psig) and connections are made to large gate valves at convenient plumbing locations. Thus, regulation of water flow from these large valves, which normally are used to control rates of tens of liters per minute, through the device becomes important. The flow restrictor 68 eliminates any need on the part of the installer or maintenance technicians to adjust their water supply flow rate or pressure.

The pump system 10, according to the present invention, is preferably contained in a compact mountable box or case 70, as shown in FIG. 2. In particular, the components of the system 10 are conveniently contained within a case 70 having a hinged cover 72 with the inlet 22, the gas outlet 38, the liquid outlet 50, the wash-water inlet 64 and the wash-water outlet 66 extending from the exterior of the case. Thus, the case 70 can be mounted to a wall, for example, wherein the system 10 can be connected to on-site fluid lines via the various fluid connections 22, 38, 50, 64 and 66 which extend outside of the case.

In this regard, the cover 72 is preferably hinged to the case 70 to open in a downward direction when the case is mounted to the wall. The cover 72 further preferably includes at least one lanyard 74 for suspending the cover in a horizontal orientation with respect to the case. In this manner, the cover 72 provides a shelf for placing tools or other items during servicing or repair of the system. Preferably, the cover 72 defines an interior compartment 76 for holding such tools or spare parts.

The case 70 further provides convenient structure for mounting an electrical terminal 78 for providing electrical power to the motor 16 from an electrical source via electrical wiring (not shown) fed through an external electrical port 80 of the case. The electrical terminal 78 and port 80 are preferably mounted to an interior surface of the case generally above the pumping components so that any leakage in the system will not come into contact with the electrical connections of the terminal.

The case 70 further preferably includes a drain outlet 82 provided in a bottom surface of the case to drain any leakage in the system out of the case. The drain outlet 82 is preferably in the form of a check-valve or a ball-valve, which permits only one-way fluid flow out of the case 70. As a result, exterior contaminants are prevented from entering the case.

As mentioned above, the pumps 12 and 14 and the motor 16 are oriented horizontally. The purpose for this orientation is to prevent any possible damage to the electric motor 16 from liquid leakage which might issue from a pump 12 or 14. Specifically, when the pumps 12 and 14 are oriented horizontally with respect to the motor 16, any leakage from a pump will simply fall to the bottom of the case 70 and will be drained out of the case via the drain outlet 82.

An added advantage in orienting the assembly horizontally is improved performance with respect to liquid/gas separation. The horizontal assembly arrangement as shown in FIGS. 1 and 2 allows for a relatively straight vertical liquid feed tube 42, which facilitates bubbles rising to the top thereby readily separating the entrained gas bubbles. The full range of flow angles for the pumps 12 and 14 (typically ranging from 7.5°-to-22°) are accommodated by this arrangement.

Nevertheless, it is totally conceivable to orient the pumps 12 and 14, with respect to the motor 16 in a vertical arrangement, as shown in the alternative embodiment of FIG. 3. This may be necessary, for example, due to the on-site limitations in installing the system. In this embodiment, the first pump 12 is positioned above the motor 16 and the second pump 14 is positioned below the motor. Operation of the system 10, however, is identical to that described above.

Figure 4:
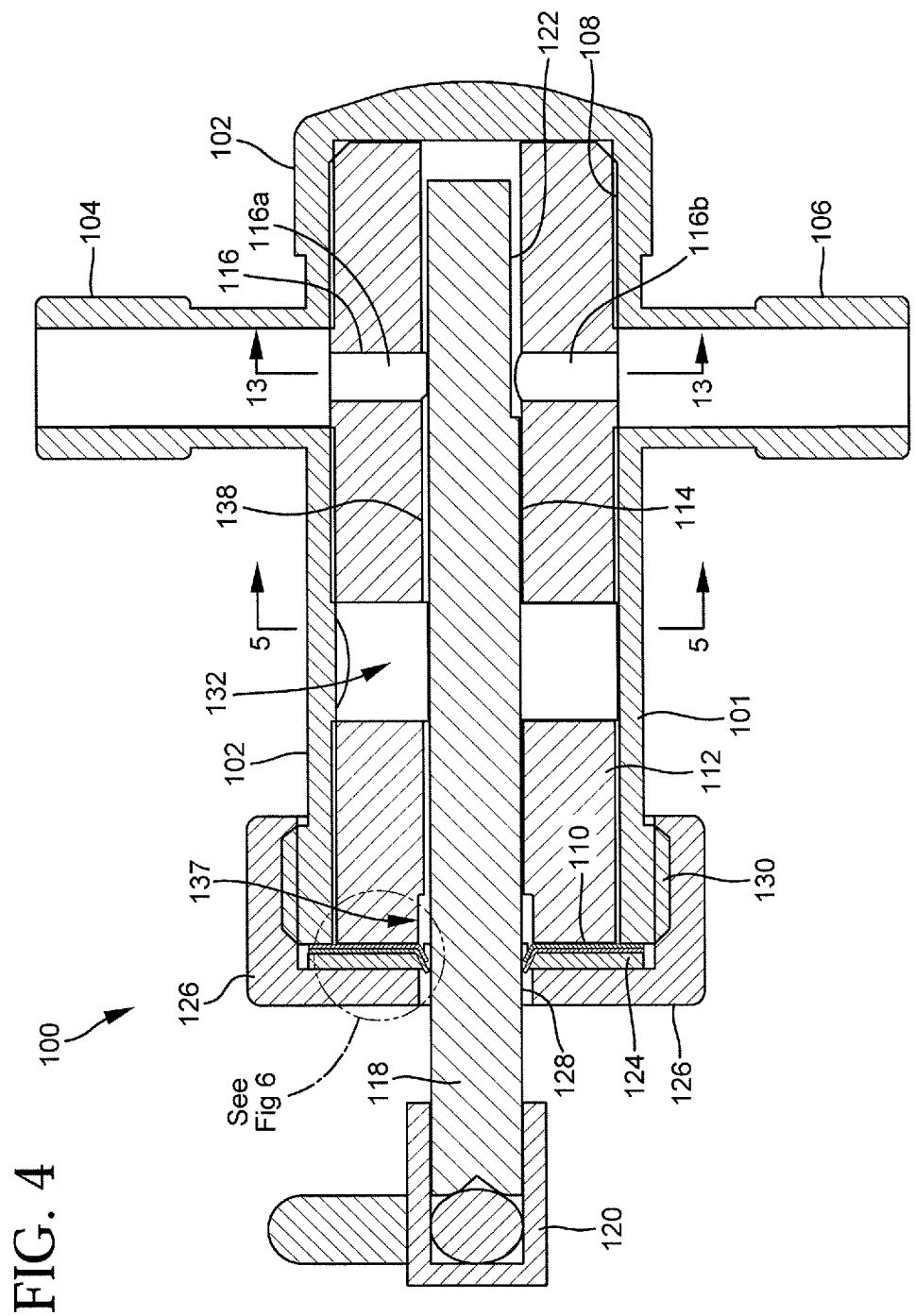
FIG. 4 is a cross-sectional view of the preferred embodiment of the pump according to the present invention.

FIG. 4 shows a preferred embodiment of a pump 100 for use in the present invention. The pump 100 generally includes a pump housing 101 and a piston 118. The pump housing 101 preferably includes a plastic pump casing 102 having an inlet port 104 and an outlet port 106. The pump casing 102 is preferably made from a rigid polyvinyl chloride (PVC) and defines a cylindrical chamber 108 having an open end 110. Received in the cylindrical chamber 108 is a ceramic piston liner 112 having a central longitudinal bore 114 and a transverse bore 116 communicating with the longitudinal bore. The transverse bore 116 includes an inlet portion 116a fluidly communicating with the inlet port 104 of the pump casing 102 and an outlet portion 116b fluidly communicating with the outlet port 106 of the pump casing so that a liquid, such as a chlorine solution, can be pumped from the inlet port, through the liner, to the outlet port in a manner as will be described below.

The pump 100 further includes a ceramic piston 118 axially and rotatably slidable within the central bore 114 of the piston liner 112. One end of the piston 118 extends out of the open end 110 of the pump casing 102 and includes a coupling 120 for engagement with a motor. At its opposite end, the piston 118 is formed with a relieved portion 122 disposed adjacent the transverse bore 116 of the pump liner 112. As will be described below, the relieved portion 122 is designed to direct fluid into and out of the pump 100.

A lip seal assembly 124 is provided at the open end 110 of the pump casing 102 to seal the piston 118 and the pump chamber 108. The lip seal assembly 124 is retained at the open end 110 of the pump casing 102 by a gland nut 126 having a central opening 128 to receive the piston 118. The gland nut 126 is preferably attached to the pump casing 102 with a threaded connection 130 provided therebetween.

In operation, a motor (not shown in FIG. 4) drives the piston 118 to axially translate and rotate within the central bore 114 of the piston liner 112. In order to draw liquid into the transverse bore 116 from the inlet port 104, the piston 118 is rotated as required to align the relieved portion 122 with the inlet port. The piston 118 is then drawn back as required to take in the desired volume of liquid into the central bore 114 of the pump liner 112. Withdrawal of the piston 118 produces a negative pressure within the inlet portion 116a of the transverse bore 116, which draws in liquid from the inlet port 104. The piston 118 is then rotated to align the relieved portion 122 with the outlet port 106 of the pump casing 102. Finally, the piston 118 is driven forward the required distance to force liquid into the outlet port 106 via the outlet portion 116b of the transverse bore 116 to produce the desired discharge flow.

When pumping liquids with the pump shown in FIG. 4, some of the liquid will invariably seep into the space between the piston 118 and the piston liner 112. As mentioned above, one problem with pumping certain liquids, particularly NaOCl solutions, is the tendency for the liquid trapped between the piston 118 and the liner 112 to evaporate and crystallize during pump idle time. Such crystallization can build up on the piston 118 and eventually cause it to seize within the pump liner 112. As mentioned previously, precipitates resulting from reaction of the sodium hypochlorite solution and metallic salts, which may be present in wash water, can also contribute to this seizing problem. Elimination of the wash water will preclude any precipitates which are reaction products, but that leaves the problem of crystallization unsolved.

A solution to this crystallization problem is to form the pump liner 112 with a liquid reservoir 132 in communication with the central bore 114 of the liner. The liquid reservoir 132 allows a sufficient volume of liquid to be maintained around the pump piston 118 so as to prevent crystallization of the liquid. Specifically, by trapping a sufficient volume of liquid within the liquid reservoir 132, the surface to volume ratio of the liquid surrounding the piston 118 is decreased, thereby decreasing the tendency for the liquid to evaporate and crystallize. It has been found that at least approximately 0.7 cc of liquid volume is sufficient to prevent crystallization of the liquid.

Figure 5:
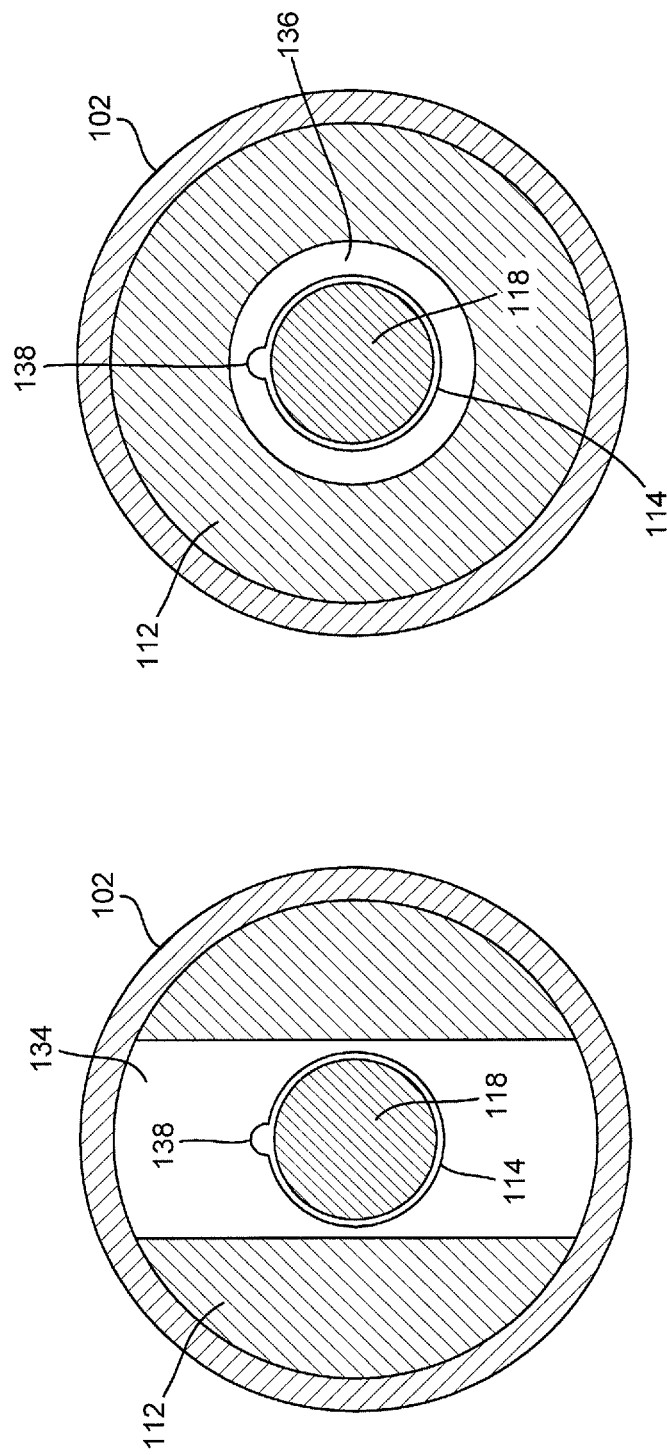
FIG. 5 is a cross-sectional view of the pump shown in FIG. 4 taken along line 5-5.

The liquid reservoir 132 can take the form of a transverse bore 134 formed in the liner 112 and having a width greater than the diameter of the liner central bore 114, as shown in FIG. 5. Alternatively, the liquid reservoir 132 can take the form of an annular counter-bore 136 formed in the liner 112 surrounding the liner central bore 114, as shown in FIG. 5a. Also, a counter bore 137 may be provided in the liner 112 surrounding the central bore 114 at the open end 110 of the liner in addition to the liquid reservoir 132. The counter bore 137 provides an additional reservoir for storing lubricating liquid.

It can thus be seen that the liquid reservoir 132 eliminates the need for a wash-water system 56, as described above. Instead, lubrication and cleaning of the pumps, which had been provided by the water of the wash-water system, is now achieved by the pumping liquid Eliminating the wash-water system results in only one liquid being present within the pump, thereby eliminating the chance of adverse liquid mixing reactions (e.g., copper and rust contamination).

To increase the fluid flow surrounding the piston 118 and thereby further decrease the chance for this liquid to evaporate, the liner 112 is further preferably formed with a pressure relief slot 138 (also termed a "scavenger slot"). The pressure relief slot 138 communicates with and extends longitudinally along the central bore 114 of the liner 112 from the open end 110 of the liner to the inlet portion 116a of the transverse bore 116. The pressure relief slot 138 thus formed facilitates fluid flow back to the inlet portion 116a of the transverse bore 116 due to the negative pressure created at the inlet portion by movement of the piston 118. In other words, the negative pressure created at the inlet portion 116a of the transverse bore 116 tends to draw the liquid surrounding the piston 118 back to the inlet portion via the pressure relief slot 138. Also, since the outlet portion 116b of the transverse bore continuously sees a positive pressure, even during pump idle times, any migration of trapped liquid toward the negative pressure inlet portion 116a will be replaced with fresh liquid thereby further inhibiting crystallization.

Figure 6:
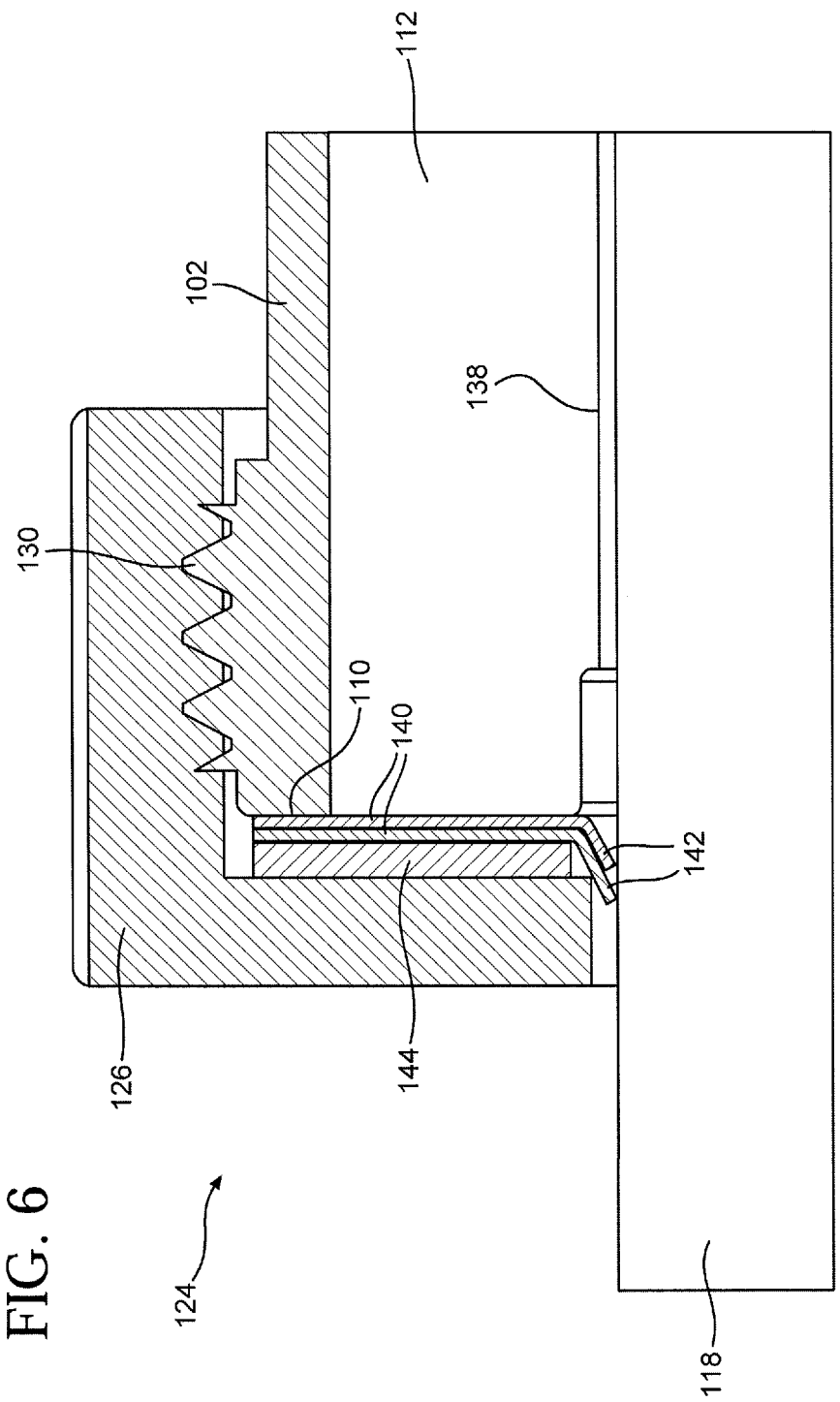
FIG. 6 is an enlarged cross-sectional view of the pump seals shown in FIG. 4.

An additional benefit of the pressure relief slot 138 is a reduction in leakage from the open end 110 of the piston casing 102. As described above, the pressure relief slot 138 draws the liquid away from the open end 110 of the pump casing 102 toward the transverse bore 116. Thus, the natural tendency of the fluid flow will not be toward the open end 110 of the casing 102. This enables the lip seal assembly 124 to be arranged in an advantageous manner. Specifically, rather than having two lip seals arranged "back-to-back," wherein the lips of the seal are bent in opposite directions, the lip seal assembly of the present invention can include two ceramic loaded polytetrafluoroethylene (PTFE) lip seals 140 sandwiched together such that their bent lips 142 both face outwardly away from the interior chamber 108 of the piston casing 102, as shown in FIG. 6. A white Teflon washer 144 may also be provided between the lip seals 140 and the gland nut 126 to help secure the lip seals against the open end 110 of the pump casing 102. The washer 144 can also be interposed between the lip seals 140, wherein the bent lips 142 of each lip seal are separated from each other a distance equal to the thickness of the washer.

By having both lip portions 142 face away from the interior of the pump casing, any debris from erosion of the lip seal 140 will tend to travel away from the interior of the pump rather than travel into the pump. The benefit again is to reduce the chance of material entering the pump and causing the piston to seize.

Also, having both lip portions 142 of the seal facing outwardly increases the scraping ability of the lip seal to remove any debris or residue from the outside of the piston 118 before entering the pump. In this regard, it is preferred to coat the outside of the ceramic piston 118 with a vapor-deposited polytetrafluoroethylene (PTFE) coating, as described in commonly owned U.S. Publication Nos. 2004-0241023-A1 and 2005-0276705-A1.

As mentioned above, another problem associated with liquid NaOCl pumping systems is the corrosive effect that chlorine vapors have on the various metal components of the system. To offset this problem, the present invention utilizes sacrificial zinc components in electrical contact with the various other metal components of the pumping system, such as metal screws, clamps and piston couplings, which are vulnerable to corrosion by exposure to these chlorine vapors.

In particular, the entire pumping apparatus 10 is preferably mounted to a hot or cold-dipped zinc back plate 150, which in turn is attached to the plastic case 70 via zinc die-cast screws or stainless steel screws 152, as shown in FIGS. 1 and 2. Where possible, all metal components of the pumping apparatus 10 are mechanically and electrically connected to the zinc coated back plate 150. For example, the pump mounting bases 154, the electrical terminal 78 and the various hose clamps (not shown) for securing the apparatus 10 are all attached to the zinc back plate 150 via zinc die-cast screws 152. Also, zinc washers 156 are preferably provided under the terminal screws 158 of the electrical terminal 78.

By placing all steel and aluminum components in contact with a zinc component in this manner, it has been found that the steel and aluminum components are protected from chlorine vapor corrosion by the mechanism of cathodic protection. Cathodic corrosion protection is well understood and relies on the use of a sacrificial active metal, which acts as an anode in electrolytic coupling to a less active metal. Such anode protectors are often used in water tanks and attached to boat hulls in order to protect the more noble metals from corrosion.

In situations where steel and aluminum components are not easily put in contact with the zinc back plate 150, the present invention utilizes other sacrificial zinc components. Specifically, the motor 16 of the pumping apparatus 10 according to the present invention is preferably mounted to a zinc coated mounting plate 160, which is in contact with the steel motor shaft 162 via a steel bearing 164. Also, the motor 16 is preferably provided with zinc alloy housing end caps 166 to provide further cathodic corrosion protection to the steel components of the motor.

Figure 7:
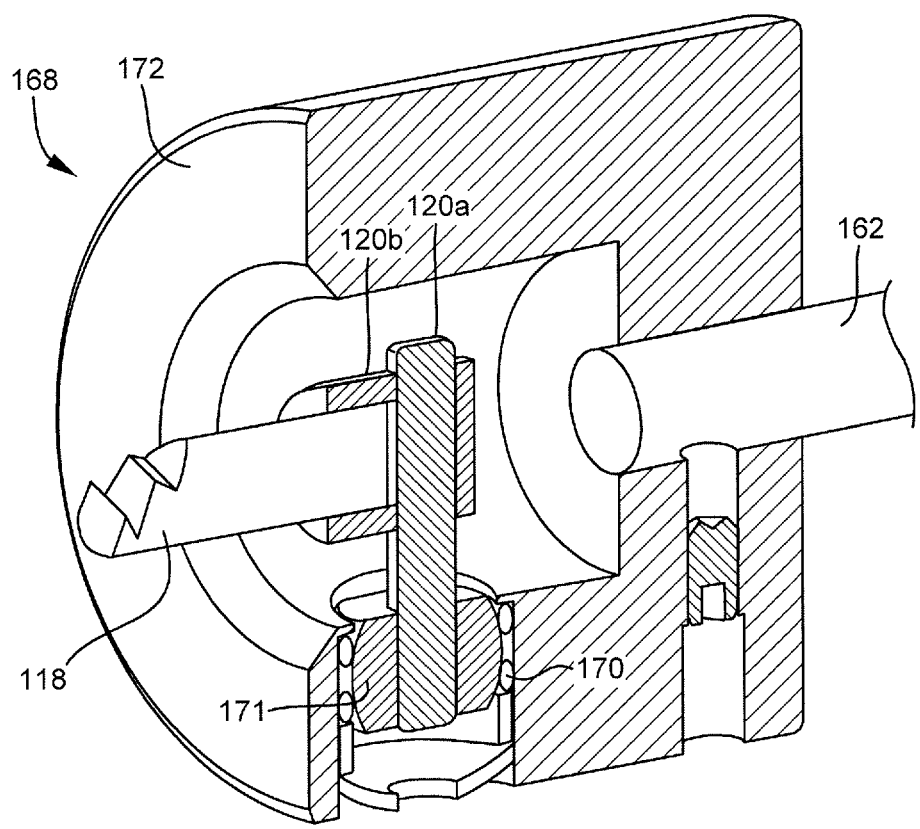
FIG. 7 is a cross-sectional view of the pump piston coupling according to the present invention.

As shown in FIG. 7, the steel pin 120*a* and aluminum coupling 120*b* for connecting the ceramic piston 118 of the pump 100 to the motor 16 can be cathodically protected from corrosion by replacing the nylon bearing, typically used in such motor/pump couplings 168, with a steel bearing race 170. The steel bearing race 170 rotatably receives a spherical steel ball 171 connected to the pump piston 118 and is retained within an aluminum pump coupling housing 172, which in turn is fixed on the end of the motor shaft 162. As discussed above, the motor shaft 162 is in contact with the zinc motor mounting plate 160 and/or the zinc housing end caps 166 of the motor 16. Thus, an electrical path is provided between the steel pump coupling 120 and the zinc motor mounting plate 160 and/or the zinc housing end caps 166, whereby these zinc components are sacrificed to protect the steel pump coupling 120 from corrosion.

It should further be explained that, although the zinc parts are sacrificed in order to protect the steel and aluminum parts, this is an extremely slow process, because the chlorine vapor corrosion is far more limited in its capacity to consume the zinc than would be the case for parts immersed in solutions of salt or NaOCl. This means that the zinc coatings and zinc parts show very slight loss of mass in this application while performing their role of cathodic corrosion protection.

As also discussed above, still another design consideration with such pumping systems is the necessity that the system only pump in one direction. Unfortunately, detrimental reverse pumping can occur if the polarity of the current flowing to the preferred DC motor 16 were somehow reversed. To ensure pumping in only one direction, regardless of the polarity of the current, the present invention preferably makes use of a full wave rectifier 174 in a unique manner to convert input direct current of either polarity to direct current of the desired polarity.

Figure 8A:
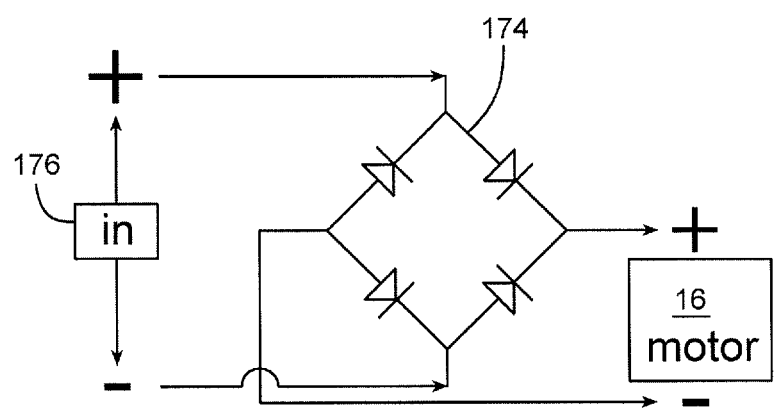
FIGS. 8a and 8b are electrical circuit diagrams for the electrical system for preventing reverse pumping according to the present invention.
Figure 8B:
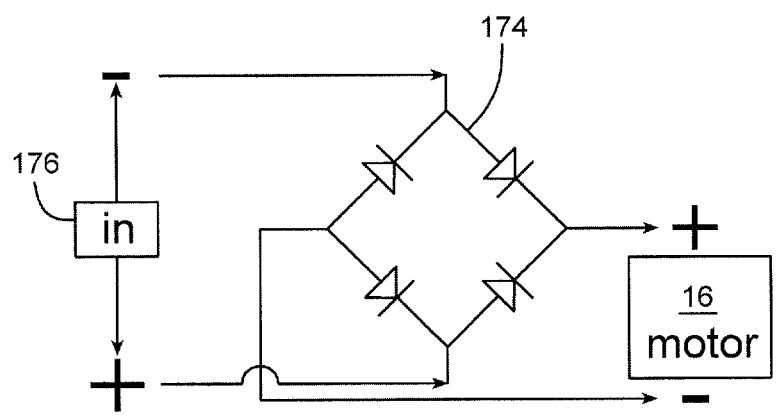
Figure 14:
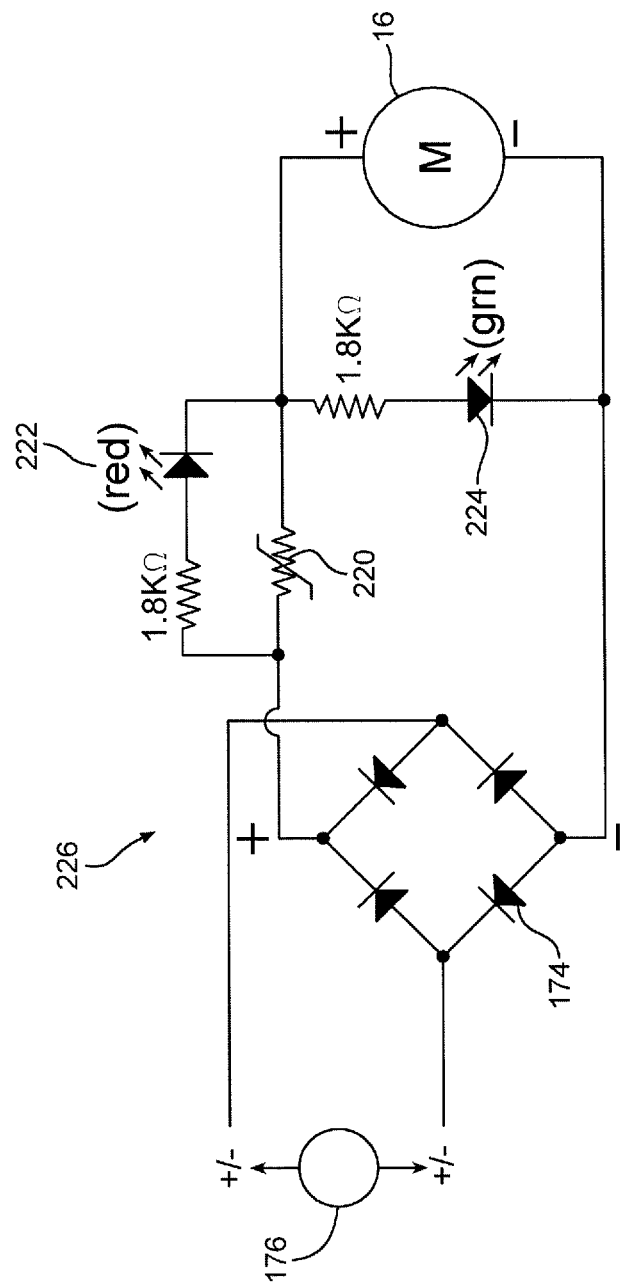
FIG. 14 is an electrical circuit diagram for the electrical system for preventing damage to the pump motor according to the present invention.

As is well known in the art, full wave rectifiers are conventionally used to convert alternating current (AC) to direct current (DC). However, as shown in FIGS. 8*a*, 8*b* and 14, the present invention utilizes a full wave rectifier 174 connected between the direct current source 176 and the motor 16 to convert input direct current of either polarity to direct current of the desired polarity. In particular, the positive output terminal of the full wave rectifier 174 is electrically connected to the positive input terminal of the motor 16 and the negative output terminal of the rectifier is electrically connected to the negative input terminal of the motor 16. The full wave rectifier 174 restricts the flow of positive current to its positive output terminal regardless of the polarity of the current received at its input terminals. Thus, the desired polarity of the current flowing to the motor 16 can be guaranteed and, as a result, the motor shaft will rotate in only one desired direction. A suitable full wave rectifier 174 for use with the present invention is Digi-Key P/N KBL01-E4/51GI-ND, supplied by Digi-Key Corporation.

Another way reversed pumping can occur is if the pumps and motor couplings are not properly oriented with respect to the rotational axis of the motor shaft. To ensure proper orientation of the pumps with respect to the rotational axis of the motor shaft, the present invention utilizes a mechanical stop means that prevents the pump from being misaligned with the motor shaft axis.

As described above, and with reference to FIGS. 4, 7 and 9, the motor 16 drives the piston 118 of the pump 100 to axially translate and rotate within the central bore 114 of the piston liner 112 between the inlet port 104 and the outlet port 106. The piston 118 is rotated as required to align the relieved portion 122 with the inlet port 104 and is then drawn back as required to take in the desired volume of liquid into the central bore 114 of the pump liner 112. The piston 118 is then rotated to align the relieved portion 122 with the outlet port 106 of the pump casing 102. Finally, the piston 118 is driven forward the required distance to force liquid into the outlet port 106 to produce the desired discharge flow.

Figure 9:
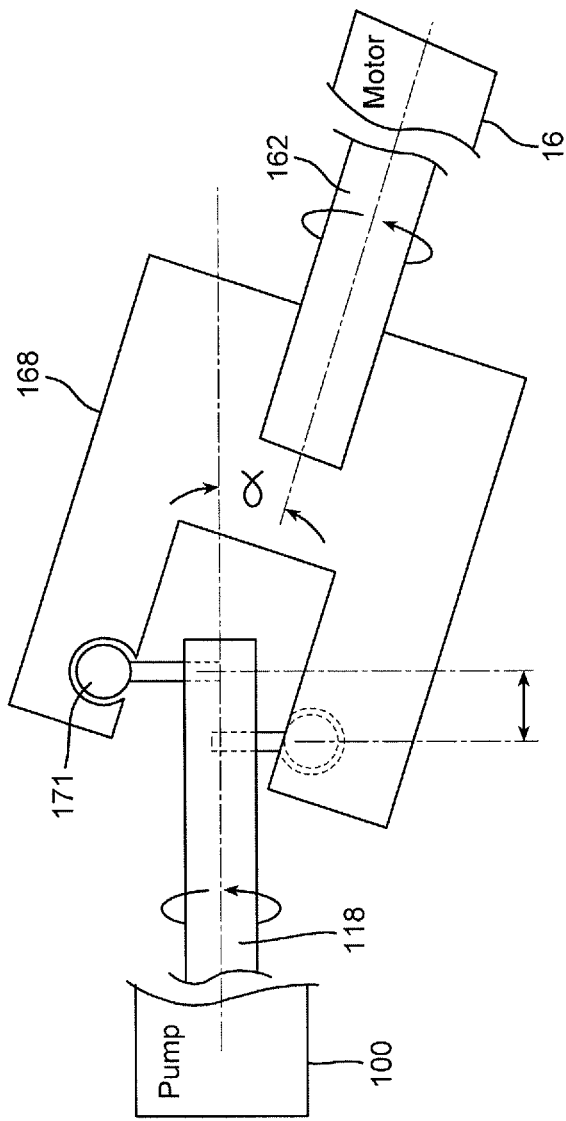
FIG. 9 is a diagrammatic cross-sectional view of the pump/motor coupling.

This combined axial and rotational motion of the pump piston 118 is achieved by orienting the rotational axis of the pump piston 118 at an angle α with respect to the rotational axis of the motor shaft 162 and using a spherical ball and socket coupling 168 to couple the motor shaft to the pump piston, as is diagrammatically shown in FIG. 9. As can be understood with regard to positive displacement pumps of this nature, the greater the angular displacement α between the pump piston 118 and the motor shaft 162, the greater the axial displacement of the piston 118 in the pump which causes a higher rate of fluid flow. As the rotational axis of the piston 118 is brought closer in alignment to the rotational axis of the motor shaft 162, the displacement of the pumping piston becomes smaller within the pump, resulting in a lower volume of fluid flow. When the pump piston 118 and the motor shaft 162 are substantially coaxially aligned with each other, (i.e., when α=0), the piston will have no stroke nor will it reciprocate upon rotation. Thus, no pumping action takes place in this position.

As is shown in FIGS. 10a and 10b, the angular orientation of the pump piston 118 with respect to the motor 16 also determines the direction of pumping for the pump 100. Thus, with the pump 100 angularly oriented with respect to the motor 16, as shown in FIG. 10a, the piston 118 will be oriented and operate to correctly pump liquid out of the outlet port 106 while the opposite port serves as the inlet port 104. When the pump 100 is pivoted in a counter-clockwise direction from the axially aligned middle position, as shown in FIG. 10b, the direction of the fluid flow will reverse resulting in the port 104 becoming the outlet port and port 106 becoming the inlet port. Once again the magnitude of the angular displacement of the pump piston 118 from the middle position will determine the amplitude of piston stroke, and, consequently, the rate of fluid flow.

Figure 11A:
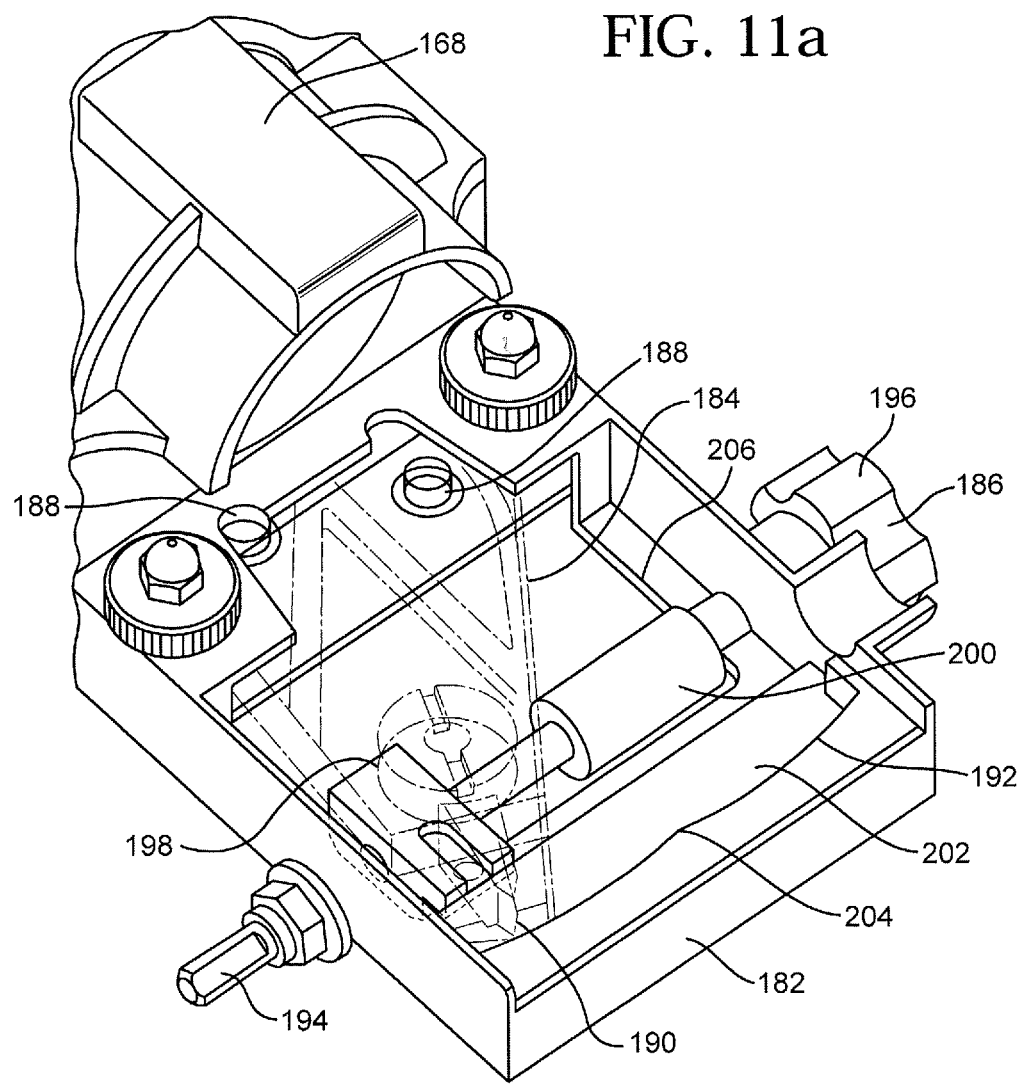
FIG. 11a is a top perspective view of the pump support assembly of the present invention, with the pump removed, and the swivel platform pivoted in a first position.
Figure 11B:
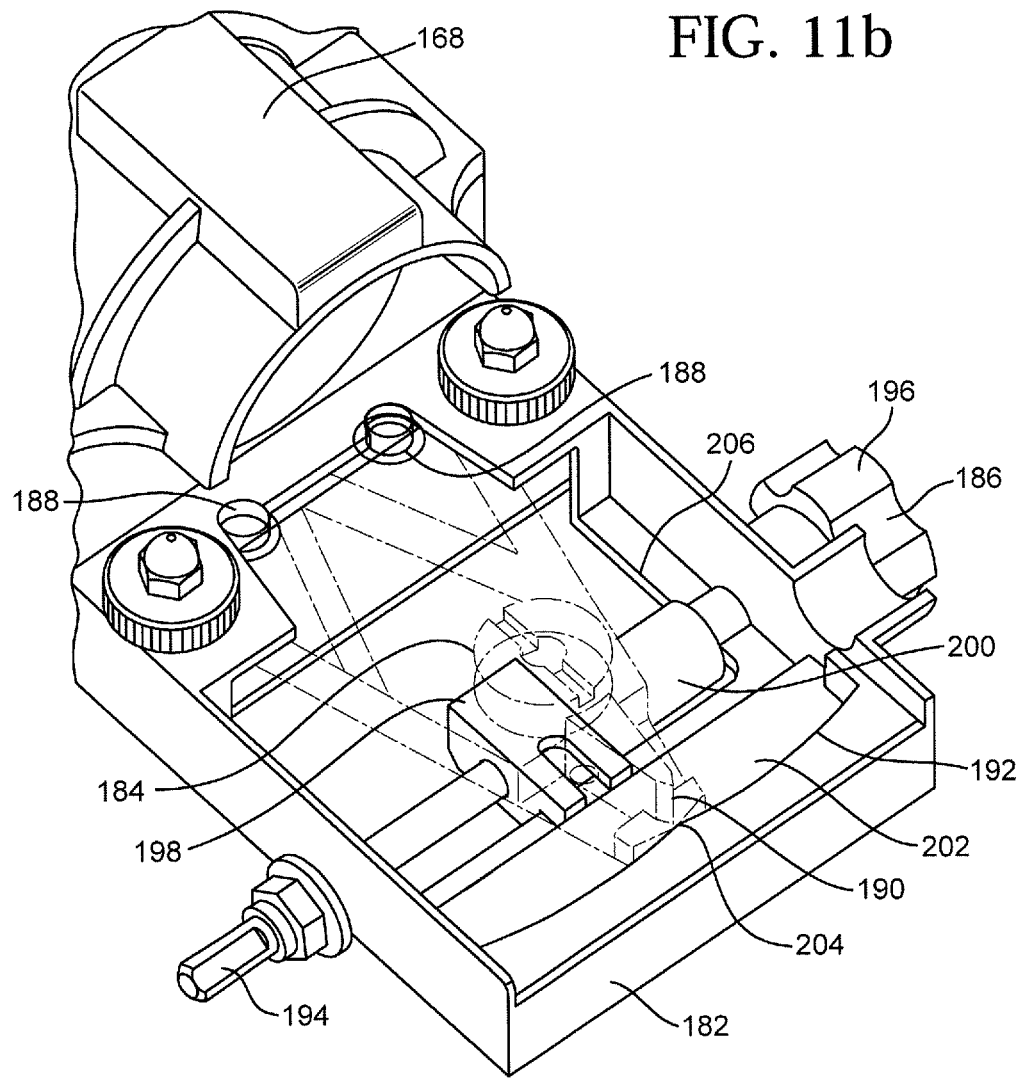
FIG. 11b is a top perspective view of the pump support assembly of FIG. 11a with the swivel platform pivoted in a second position.
Figure 12:
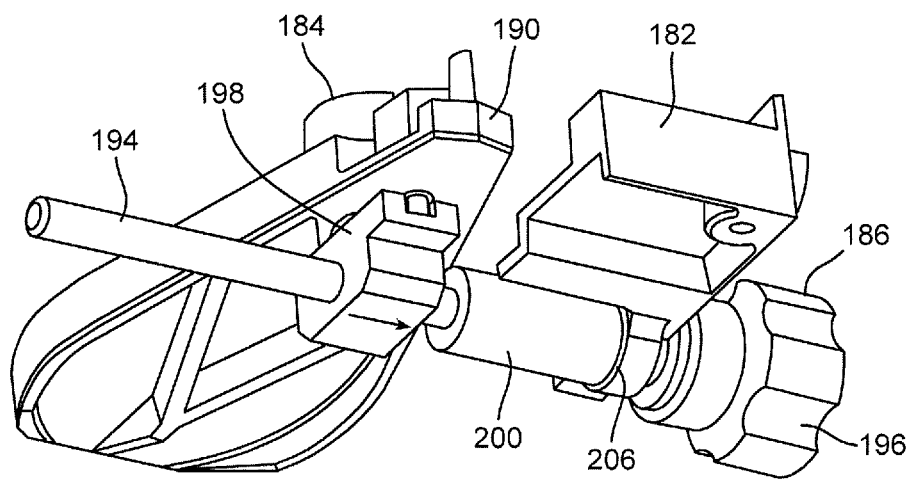
FIG. 12 is a bottom perspective view of the swivel platform shown in FIGS. 11a and 11b.

Referring additionally to FIGS. 11a, 11b and 12, to accurately set the angle α between the rotational axis of the pump piston 118 and the rotational axis of the motor shaft 162, the pump 100 and motor coupling assembly 168 are preferably mounted on a pump support assembly 180. The pump support assembly 180 generally includes a support frame 182, a swivel platform 184 pivotable within the support frame and a drive assembly 186 for pivoting the swivel platform within the support frame. The pump 100 is mounted on the swivel platform 184 of the support assembly 180, which permits swivel movement of the pump 100 angularly with respect to the support frame 182 both clockwise and counterclockwise.

The swivel platform 184 pivots about a bearing means in the form of two perpendicular posts 188, which act cooperatively with an indicator edge 190 on the platform 184 as it bears against a cam surface 192 formed in the support frame 182 so that dual pivot axes are established to control deflection of the platform 184. One of the bearing posts 188 is used for each direction of angular deflection of the piston and cylinder with respect to the pump drive axis. Thus, the cam surface 192 is provided to permit freedom to only one bearing post to float at a time, and to provide directional restraints to permit such float in only one direction for each bearing post. As a result of this unique arrangement, when both axes are restrained simultaneously, there is no angular deflection nor piston reciprocation, and thus, no fluid being pumped. A pump support assembly of this type is shown and described in commonly owned U.S. Pat. No. 4,941,809, the specification of which is incorporated herein by reference in its entirety for all purposes.

Figure 11C:
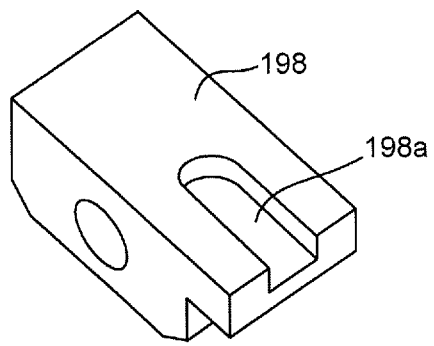
FIG. 11c is an isolated top perspective view of the swivel platform guide block.

The support assembly 180 further includes a drive assembly 186 to accurately pivot the swivel platform 184 within the support frame 182. The drive assembly 186 includes a fine threaded rod 194, rotatably retained on opposite sides of the support frame 182, a knob 196 for rotating the rod and an internally threaded guide block 198 threadably engaged with the rod. The guide block 198 is attached to the bottom of the swivel platform 184 and is driven by the threaded rod 194 to pivot the platform within the support frame 182. Specifically, as the rod 194 rotates, the threaded engagement between the rod and the guide block 198 will cause the guide block to traverse along the length of the rod. This in turn will cause the swivel platform 184, which is attached to the guide block 198, to pivot within the support frame 182. Referring additionally to FIG. 11c, to facilitate such movement, the guide block 198 can be pivotably attached to the swivel platform 184 through engagement of a slot 198a by a pin extending from the bottom of the swivel platform 184, or the guide block can be provided with an internally threaded swivel bearing to receive the rod 194.

To prevent the swivel platform 184 from pivoting too far into a position where reverse pumping will occur, as shown in FIG. 10b, the drive assembly 186 of the present invention further includes a spacer 200. The spacer 200 is a tubular member having an inner longitudinal bore sized to receive the threaded rod 194. The length of the spacer 200 is selected to match roughly half the width of the inner pocket 202 of the support frame 182. As will be described in further detail below, this will restrict pivoting of the swivel platform 184 within only one half of the support frame 182.

In use, rotation of the threaded rod 194 within the guide block 198 and the spacer 200 will cause the swivel platform 184 to pivot about an arc within the lower half of the support frame 182, as shown in FIG. 11a. Continued rotation of the threaded rod 194 in one direction will case the swivel platform 184 to reach the mid-point 204 of the support frame 182, as shown in FIG. 11b, wherein the pump piston 118 will be axially aligned with the shaft 162 of the motor 16. At this point, one end of the spacer 200 makes contact with the guide block 198, while the other end of the spacer makes contact with an inner wall 206 of the support frame 182, thereby stopping any further movement of the swivel platform 184. Thus, the length of the spacer 200 should be precisely selected to permit the swivel platform 184 to pivot to a position where the pump piston 118 and the motor shaft 162 are axially aligned, but to restrict any further movement of the swivel platform. As a result, the pump 100 is prevented from ever being pivoted into a position where reverse pumping can occur, as shown in FIG. 10b.

Figure 13:
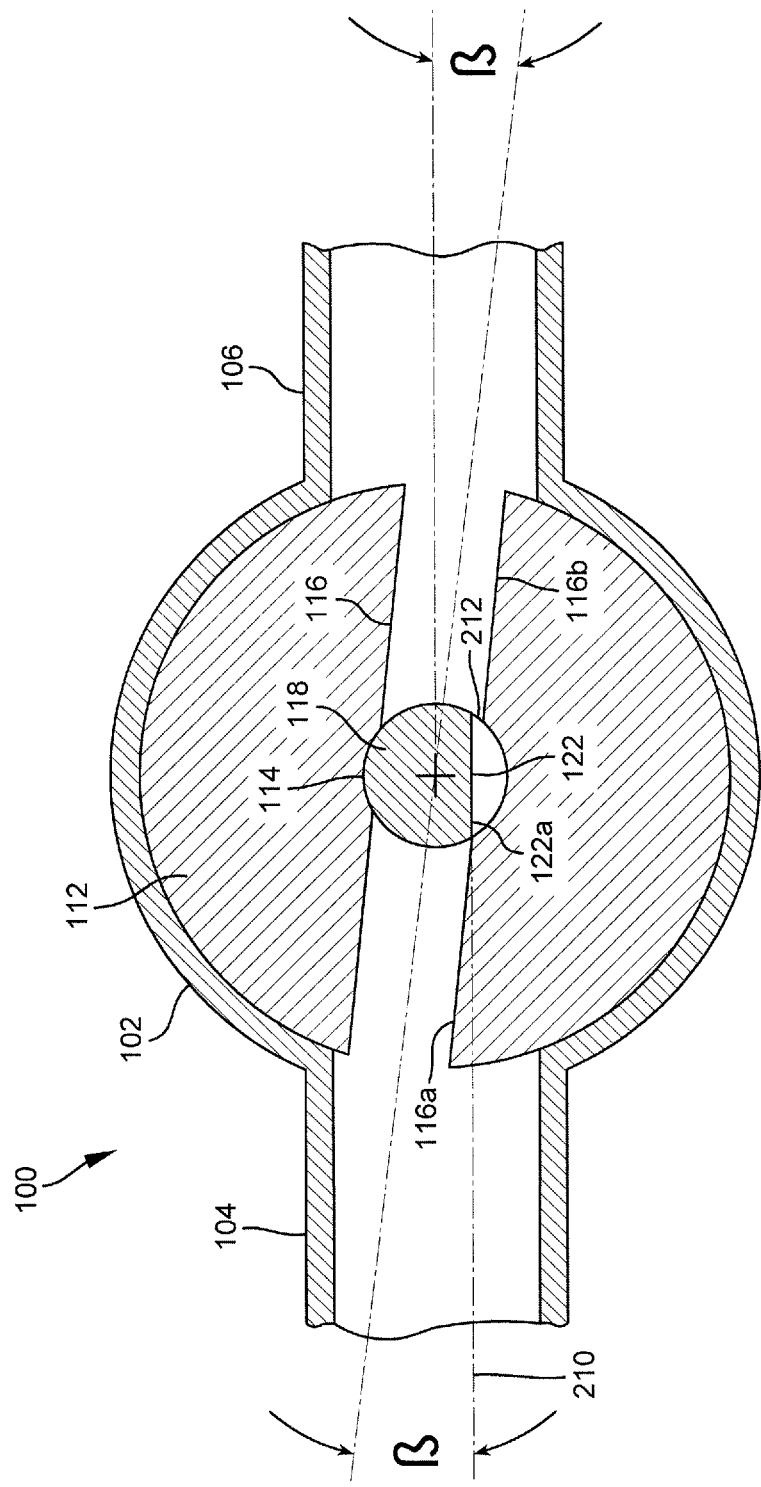
FIG. 13 is a cross-sectional view of the pump shown in FIG. 4 taken along line 13-13.

Another feature of the present invention involves the measures taken to prevent leakage and ensure proper operation of the pumps. Specifically referring to FIG. 13, (which is a cross-sectional view of the pump 100, shown in FIG. 4, taken along the line 13-13), the pump 100 of the present invention is designed to prevent hydraulic lock by ensuring that any liquid held in the relieved portion 122 of the piston 118 is not trapped when the piston 118 moves to its forward most extended position within the pump's axial bore 114. In other words, the design of the pump 100 of the present invention continues to allow fluid to escape through the pump outlet 106 as the piston 118 moves to the end or bottom of its stroke.

In conventional pumps of this type, the inlet and outlet portions of the pump liner are oriented generally parallel with the flat surface of the piston relieved portion when the piston moves to the end of this stroke. However, any misalignment between the two can result in fluid being trapped in the relieved portion as the piston moves to the end of its stroke. Thus, a pressure build-up within the pump causing can occur causing the end cap of the pump housing to rupture.

The present invention solves this problem by ensuring that the fluid can escape the relieved portion of the piston as the piston moves to the end of its stroke. This is achieved by angularly orienting at least the outlet portion 116b of the transverse bore 116 of the piston liner 112 with respect to the "zero reference plane" 210 of the pump piston 118, wherein the "zero reference plane" of the pump piston 118 is defined by the plane formed by the flat surface 122a of the relieved portion 122 of the piston 118 when the piston is at its forward most position, (i.e., the end of its stroke) within the pump axial bore 114.

The simplest way to angularly orient the transverse outlet portion 116b is to rotate the piston liner 112 within the pump casing 102 by an angle β. Typically, the pump casing 102 has a reference mounting surface for mounting the pump to a pump support assembly, as described above. The motor 16 is also mounted to the pump support assembly and is oriented with respect to the reference mounting surface of the pump so that the motor shaft and the pump piston 118 will be properly oriented with respect to the inlet 104 and the outlet 106 of the pump 100. Therefore, by simply rotating the pump liner 112 by an angle β within the pump casing 102, the outlet portion 116a of the transverse bore will be properly positioned with respect to the zero reference plane 210 of the pump piston 118. It has been found that the angle β of rotation is preferably about 5°.

It is conceivable that other methods can be used to position the outlet portion 116b of the pump liner 112 to the desired position. For example, the entire pump 100 can be oriented at a 5° angle with respect to the motor 16. Alternatively, the outlet portion 116b itself can be formed in the pump liner 112 at an angle or offset from the inlet portion 116a.

In any event, the objective is to ensure that any liquid trapped in the relieved portion 122 of the piston 118 when the piston is at its most extended position will have an egress 212 through which the liquid can escape without being further compressed. Thus, during its output stroke, the piston moves to the bottom of its travel, while the outlet port remains open. This will prevent a pressure build-up in the axial bore, which could result in a pump failure.

Another feature of the present invention involves an electrical arrangement provided for preventing damage to the pump motor 16, and other pump components, should there be depletion in the amount of supply liquid. As shown in FIG. 14, a method for dealing with this problem has been conceived, wherein a self resetting fuse-type of device 220 is added in series with the power wires of the motor 16. The device is known as a positive temperature coefficient (PTC) resistor, or varistor, and has the electrical symbol 220 shown in FIG. 14.

The electrical characteristic of this device 220 is most importantly the current at which it switches to its high resistance state. Below this current, the PTC 220 will remain at a low resistance, allowing current to flow without attenuation to the motor 16 so that the pump is driven at speeds up to its full rated rotational velocity. Should the motor driving current exceed the PTC's trip value, its resistance will quickly rise to a very high value such that driving current to the motor 16 drops to a very low value.

In practice, typical driving circuitry to the motor 16 will automatically compensate for increased motor load by increasing voltage in order to achieve desired motor RPM. This voltage increase then leads to an increase in current flow. The facility of the motor driver circuit to increase current in the presence of increased pump load is utilized in the contemplated circuit modification to protect the pump. Such increase in load will be encountered when the driven pumps are beginning to seize because of running dry at high speed.

Measurements were made of current needed to drive the motor at various speeds with the highest pumping conditions of pressure and flow. These measurements revealed under non-seizing conditions the data shown below:

| 100 psi Wet | |
| --- | --- |
| Amps | RPM |
| 0.39 | 950 |
| 0.38 | 1060 |
| 0.39 | 1180 |
| 0.38 | 1290 |
| 0.38 | 1390 |
| 0.38 | 1500 |
| 0.37 | 1610 |

Based upon these data, a Bel Fuse Inc. part number 0ZRC0025FF1E was selected and installed in series with the motor wires of the system according to the present invention. This device has a "trip" current of 0.50 amp, which allows the pump to run unimpeded so long as friction loads caused by prolonged dry running do not call for excess drive current. Upon artificial application of external drag on the pump drive spindle, the unit was observed to stop without damage to any of the system components.

Once tripped, it is advantageous for the PTC 220 to remain in its high resistance protective state with very small current flow. This means that the pump system will remain in a standby mode until power is removed and then, after a brief pause, reinstated. It is during this pause time that technicians can attend to empty supply vessels or any other matters that might have caused excess load on the system.

It is further desirable that there be some visual indication that the pumping system is in an interrupted or not interrupted state. Such visual indication is preferably provided by a red light 222, if the system is in an interrupted state, and a green light 224 if it is running properly. The circuit 226 for accomplishing this task utilizes the full wave rectifier 174 described earlier for assuring proper rotational direction with slight modifications as shown in FIG. 14. If the PTC 220 is in the non-tripped state, the voltage drop across it will be too low to illuminate the red LED 222. Full driving voltage will, however, be across the motor terminals so that the green LED 224 is illuminated. If the PTC 220 trips, full voltage will appear across the PTC 220 so that the red LED 222 illuminates. This condition will be accompanied by loss of voltage across the motor terminals and the green LED 224 will extinguish.

As a result of the present invention, a simply designed system liquid pumping system is provided, wherein gas bubbles are dispatched automatically while replacement of an empty liquid chemical supply tank and commissioning of a new full tank is simply done by switching input tubing from the empty to the full tank. The system requires no priming and does not require the pump to be turned off when changing liquid supplies. The pumps of the system are substantially leak-free, rupture-free and less prone to chemical precipitate build-up with resultant mechanical failure.

The system of the present invention is particularly suitable for implementation as part of a chlorination system, wherein relatively small amounts of sodium hypochlorite (NaOCl) solution are injected or fed into a water stream. Such chlorination systems include those utilized by municipal water providers and swimming pool facilities.

In these applications, the system is less vulnerable to the corrosive effects that chlorine vapors have on the various metal components of the system. The system further includes safe-guards to ensure chlorine pumping in only one direction and to ensure that the system components will not be damaged in the event of a loss of supply liquid.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A pumping apparatus for pumping a liquid from a liquid source to a target comprising:
    a support frame;
    a motor mounted on said support frame, said motor having a rotatable motor shaft;
    a swivel platform pivotably mounted on said support frame;
    a drive assembly connected with said support frame and said swivel platform for pivoting said swivel platform with respect to said support frame, said drive assembly including a drive rod and a spacer, said drive rod comprising a threaded rod rotatably retained on opposite sides of said support frame and threadably engaged with said swivel platform and said spacer comprising a tubular sleeve member surrounding a portion of said threaded rod and making contact with said support frame and said swivel platform to prevent further pivoting of said swivel platform with respect to said support frame; and
    a first pump mounted on said swivel platform, said first pump including a rotatable and axially translatable piston coupled to said motor shaft of said motor,
    wherein pivoting of said swivel platform by said drive assembly changes an angle defined between a longitudinal axis of said motor shaft and a longitudinal axis of said pump piston, said spacer of said drive means limiting the range of said angle.

2. A pumping apparatus as defined in claim 1, further comprising:
    a second pump driven by said motor; and
    a separator in fluid communication with said liquid source and said first and second pumps for separating a liquid solution received from said liquid source into a gaseous component and a liquid component, said separator further diverting said gaseous component to said second pump and said liquid component to said first pump,
    wherein said second pump pumps said gaseous component back to said liquid source and said first pump pumps said liquid component to the target.

3. A pumping apparatus as defined in claim 1, wherein said support frame includes an inner pocket having a width for receiving said swivel platform, said inner pocket defining a range of pivoting of said swivel platform, and wherein said threaded rod and said spacer are disposed within said inner pocket, said spacer having a length substantially equal to half the width of said inner pocket.

4. A liquid pump comprising:
    a pump housing defining a central longitudinal bore and a transverse bore communicating with said central bore for conveying a liquid through said pump, said transverse bore being defined by a center axis; and
    a rotatable pump piston axially slidable within said central longitudinal bore between a fully retracted position and a full forward position for pumping the liquid through said transverse bore, said pump piston including a relieved portion in fluid communication with said transverse bore of said pump housing when said piston is axially inserted within said pump housing in its full forward position,
    wherein said relieved portion of said pump piston is defined by a planar surface, said planar surface defining a zero reference plane when said piston is axially inserted within said pump housing in its full forward position, said zero reference plane being disposed at an acute angle with respect to said center axis of said transverse bore, and
    wherein said pump housing comprises:
        a piston liner defining said central longitudinal bore and said transverse bore; and
        a pump casing surrounding said piston liner, said pump casing having a reference surface aligned with said zero reference plane of said pump piston,
        wherein said piston liner is rotated with respect to said pump casing about a center axis of said central longitudinal bore.

5. A liquid pump comprising:
    a pump housing defining a central longitudinal bore and a transverse bore communicating with said central bore for conveying a liquid through said pump, said transverse bore being defined by a center axis; and
    a rotatable pump piston axially slidable within said central longitudinal bore between a fully retracted position and a full forward position for pumping the liquid through said transverse bore, said pump piston including a relieved portion in fluid communication with said transverse bore of said pump housing when said piston is axially inserted within said pump housing in its full forward position,
    wherein said relieved portion of said pump piston is defined by a planar surface, said planar surface defining a zero reference plane when said piston is axially inserted within said pump housing in its full forward position, said zero reference plane being disposed at an acute angle with respect to said center axis of said transverse bore, and
    wherein said acute angle between said zero reference plane and said center axis of said transverse bore is about 5°.

* * * * *